United States Patent
Ota et al.

(10) Patent No.: US 11,902,147 B2
(45) Date of Patent: Feb. 13, 2024

(54) REMOTE ACCESS SYSTEM, REMOTE ACCESS CONTROL METHOD, AND NON-TRANSITORY RECORDING MEDIUM

(71) Applicants: Hiroshi Ota, Tokyo (JP); Motohiro Nagao, Tokyo (JP)

(72) Inventors: Hiroshi Ota, Tokyo (JP); Motohiro Nagao, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/658,864

(22) Filed: Apr. 12, 2022

(65) Prior Publication Data

US 2022/0337509 A1 Oct. 20, 2022

(30) Foreign Application Priority Data

Apr. 15, 2021 (JP) ................. 2021-068882

(51) Int. Cl.
*H04L 45/12* (2022.01)
*H04L 45/125* (2022.01)

(52) U.S. Cl.
CPC .......... *H04L 45/127* (2013.01); *H04L 45/124* (2013.01); *H04L 45/125* (2013.01)

(58) Field of Classification Search
CPC .... H04L 45/124; H04L 45/125; H04L 45/127
See application file for complete search history.

(56) References Cited

U.S. PATENT DOCUMENTS

| | | | |
|---|---|---|---|
| 10,609,152 B2* | 3/2020 | Kumar ................. | H04L 63/0281 |
| 10,834,138 B2* | 11/2020 | Neystadt ............. | H04L 67/563 |
| 10,951,589 B2* | 3/2021 | Neystadt ............. | H04L 67/563 |
| 10,958,624 B2* | 3/2021 | Neystadt ............. | H04L 67/10 |
| 10,972,434 B2* | 4/2021 | Kupisiewicz ....... | H04L 12/4641 |
| 11,343,185 B2* | 5/2022 | Vysotsky ............ | H04L 67/141 |
| 11,411,922 B2* | 8/2022 | Shribman ........... | H04L 63/029 |
| 11,632,356 B2* | 4/2023 | Neystadt ............. | H04L 63/08 726/12 |

(Continued)

FOREIGN PATENT DOCUMENTS

| | | |
|---|---|---|
| JP | 2001-005714 | 1/2001 |
| JP | 2006-020266 | 1/2006 |

(Continued)

*Primary Examiner* — George C Neurauter, Jr.
(74) *Attorney, Agent, or Firm* — IPUSA, PLLC

(57) ABSTRACT

A communication system includes: a management server that receives, from an information terminal connectable to a first network, a connection request for connecting to a web service provided by a web server connectable to a second network; first communication control circuitry that controls communication of a communication apparatus connectable to the second network, and second communication control circuitry that controls communication of the information terminal. The first communication control circuitry connects to a relay server that relays communication between the second network and the first network. The second communication control circuitry connects the information terminal to the relay server. A request for the web service provided by the web server and a response to the request are transmitted and received between a web browser of the information terminal and the web server via the relay server and the first communication control circuitry.

12 Claims, 23 Drawing Sheets

(56) References Cited

U.S. PATENT DOCUMENTS

2012/0096116 A1* 4/2012 Mislove ............... H04L 67/289
    709/217
2015/0120784 A1  4/2015 Satoh

FOREIGN PATENT DOCUMENTS

| JP | 2014-014187 | 1/2014 |
| JP | 2015-111407 | 6/2015 |
| JP | 2019-062495 | 4/2019 |

* cited by examiner

FIG. 13

```
<!doctype html>
<html>
<head>
    <meta charset="utf-8" />
    <script type="text/javascript" src="./renderer.js"></script>
    <script type="text/javascript" src="./worker.js"></script>
</head>
<body>
    <div id="target"></div>
</body>
</html>
```

```
const https_proxy = "4567+7d099e39.proxy.srws.example.ricoh.com:443";

function FindProxyForURL(url, host) { if(url.startsWith("https:") || url.startsWith("wss:")) {
    if(host.endsWith("internal.example.com")) { return https_proxy; }    ─1901
  } return "DIRECT";

}
```
1900

REMOTE ACCESS SYSTEM, REMOTE ACCESS CONTROL METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2021-068882, filed on Apr. 15, 2021, in the Japan Patent Office, the entire disclosure of which is hereby incorporated by reference herein.

BACKGROUND

Technical Field

The present disclosure relates to a communication system, a communication control method, and a non-transitory recording medium.

Description of the Related Art

With recent workstyle reforms and prevalence of remote work, the demand for communication systems that allow remote access from a source terminal connectable to the Internet to a destination information processing apparatus connected to a local network in a company, for example, has been increasing.

Also known is technology for switching the destination to a proxy server using a proxy auto-configuration (PAC) file in accordance with the destination of access, the time of access, or the like. This technology is hereinafter referred to as "Proxy-PAC technology".

SUMMARY

According to an aspect of the present disclosure, a communication system includes a management server that receives, from an information terminal connectable to a first network, a connection request for connecting to a web service provided by a web server connectable to a second network different from the first network; first communication control circuitry that controls communication of a communication apparatus connectable to the second network; and second communication control circuitry that controls communication of the information terminal. The first communication control circuitry connects to a relay server in response to the connection request. The relay server relays communication between the second network and the first network. The second communication control circuitry connects the information terminal to the relay server. The information terminal includes a web browser. A request for the web service provided by the web server and a response to the request are transmitted and received between the web browser and the web server via the relay server and the first communication control circuitry.

According to an aspect of the present disclosure, a communication control method performed by a computer to control remote access from an information terminal connectable to a first network to a web server connectable to a second network different from the first network. The computer is connectable to the second network. The communication control method includes connecting to a relay server in response to a connection request from a management server that receives a connection request for connecting to the web server from the information terminal, the relay server relaying communication between the second network and the first network; receiving, from the relay server, a request for a web service provided by the web server, the request being made from a web browser included in the information terminal in response to connection of the information terminal to the relay server; transferring the request to the web server; receiving a response to the request from the web server; and transferring the response to the relay server.

According to an aspect of the present disclosure, a non-transitory recording medium storing a plurality of instructions which, when executed by one or more processors, cause the processors to perform a communication control method including connecting to a relay server in response to a connection request from a management server that receives a connection request from the information terminal to connect to the web server, the relay server relaying communication between the second network and the first network; receiving, from the relay server, a request for a web service provided by the web server, the request being made from a web browser included in the information terminal in response to connection of the information terminal to the relay server; transferring the request to the web server; receiving a response to the request from the web server; and transferring the response to the relay server.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 13 illustrates an example page configuration of an operation page according to the first embodiment;

FIG. 19 illustrates an example of a Proxy-PAC file according to the second embodiment;

Figure 1:
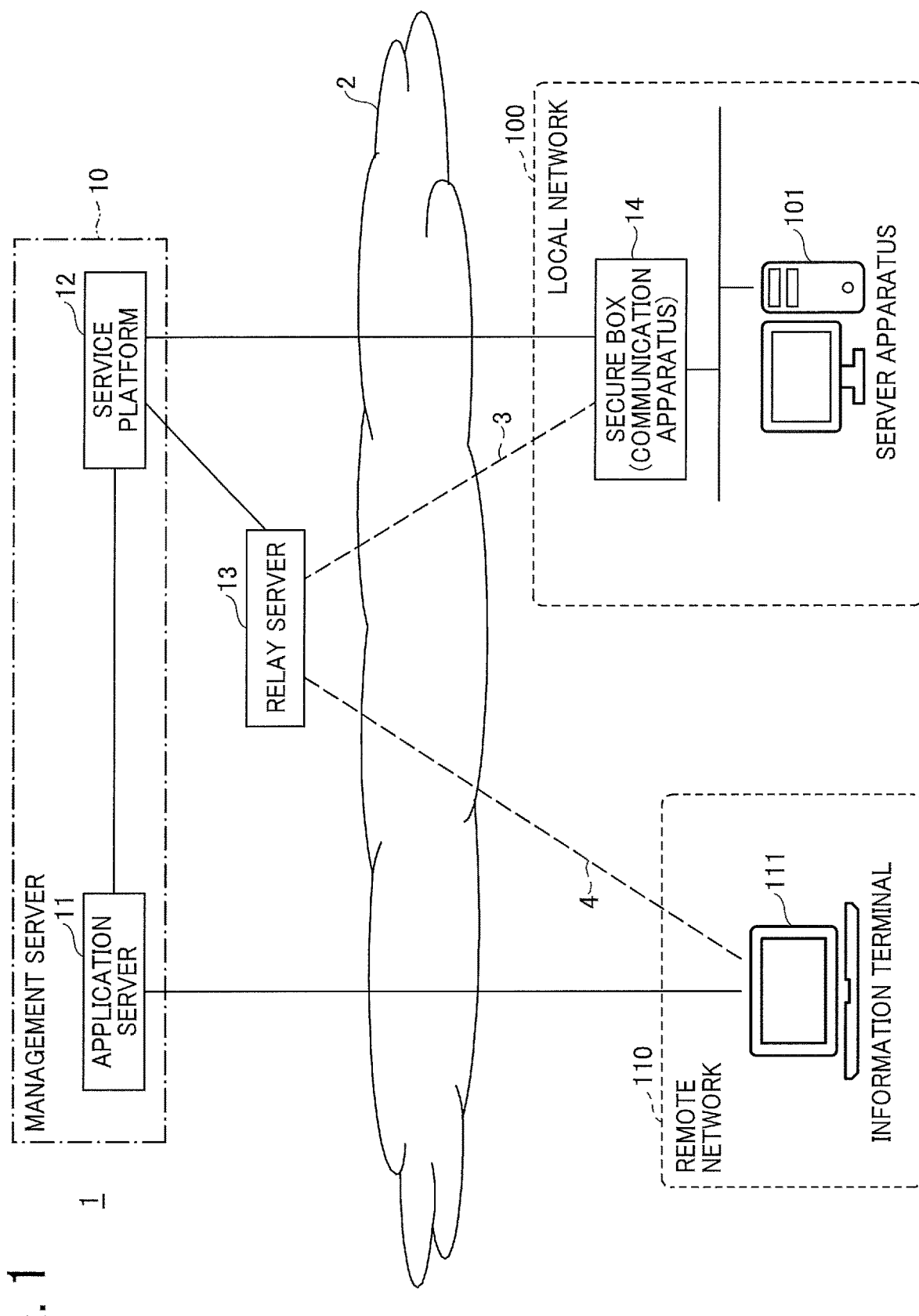
FIG. 1 is a diagram illustrating an example system configuration of a communication system according to an embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. Referring now to the drawings, embodiments of the present disclosure are described below. As used herein, the singular forms "a," "an," and "the" are intended to include the plural forms as well, unless the context clearly indicates otherwise.

Embodiments of the present disclosure will be described hereinafter with reference to the drawings.

System Configuration

FIG. 1 is a diagram illustrating an example system configuration of a communication system 1 according to an embodiment. The communication system 1 includes, for example, an application server 11, a service platform 12, a relay server 13, and a secure box 14. The application server 11, the service platform 12, and the relay server 13 are connected to a communication network 2 such as the Internet, and the secure box 14 is connected to a local network 100. The communication system 1 is a system for allowing a user to use a web service provided by a web server such as a server apparatus 101 connected to the local network 100 from a web browser included in an information terminal 111 connected to a remote network 110 that is a network outside the local network 100.

A typical web browser has a mechanism for preventing unauthorized access from out-of-range programs by using, for example, a security mechanism such as a sandbox or a same-origin policy.

As an example, there is a limitation in that content displayed in a frame such as an inline frame (iframe) on a web page is not controllable from a script outside the frame. As another example, there is a limitation in that in Proxy-PAC technology for switching the destination to a proxy server using a PAC file in accordance with the destination of access or the like, a request to be sent to the proxy server is not allowed to include the cookie value included in the page.

The communication system 1 according to this embodiment is based on the security limitations (mechanism) described above and has a system configuration illustrated in FIG. 1 to allow a user to use a web service in the local network 100 from the web browser included in the information terminal 111.

The remote network 110 is installed in, for example, a home or a remote office and is connectable to the communication network 2 such as the Internet. The remote network 110 is a first network that is a network outside the local network 100. The information terminal 111 may not necessarily be connected to the remote network 110, and may be used outdoors and connected to the communication network 2 such as the Internet by using, for example, a wide area network (WAN), a public wireless local area network (LAN), or the like. The communication network 2 is another example of the first network that is a network outside the local network 100. In the following description, as an example, the information terminal 111 is connected to the remote network 110 installed in a remote office, and the communication network 2 is the Internet.

The information terminal (accessing terminal) 111 is a computer having a web browser function, such as a personal computer (PC), a tablet terminal, or a smartphone, and is used by a user. The information terminal 111 is capable of accessing the application server 11, the relay server 13, and the like via the remote network 110 and the communication network 2. The information terminal 111 is an example of an information terminal connectable to the first network. As described above, the information terminal 111 may be connected to the Internet (i.e., the communication network 2).

The local network 100 is a network such as an in-house LAN having, for example, a firewall to restrict access from the outside such as the communication network 2 and the remote network 110. The local network 100 is an example of a second network different from the first network.

In FIG. 1, it is assumed that the service platform 12 and the secure box 14 are set in advance to be capable of communicating with each other in accordance with the Message Queue Telemetry Transport (MQTT) protocol or any other suitable protocol, for example. For example, when activated, the secure box 14 sends a request for a connection over the MQTT protocol to the service platform 12 to establish communication and maintains a state of being capable of communicating with the service platform 12.

It is also assumed that access from the information terminal 111, the relay server 13, and the like to the secure box 14, the server apparatus 101, and the like in the local network 100 is prohibited.

The server apparatus 101 is a system including a computer or a plurality of computers connected to the local network 100, and has, for example, the functions of a web server that provides web services for systems such as a business system and an attendance management system.

The application server 11 is, for example, a system including a computer or a plurality of computers connected to the communication network 2. For example, the application server 11 uses the communication system 1 to provide, to the information terminal 111, a web page or the like for accessing (or connecting to) a web service provided by the server apparatus 101 in the local network 100. For example, the application server 11 may have a function of providing a web page for performing setting on the communication system 1 to an information terminal (or a management terminal) used by an administrator or the like who manages the communication system 1.

The service platform 12 is, for example, a system including a computer or a plurality of computers connected to the communication network 2. The service platform 12 executes, for example, an authentication process for authenticating a user who uses the information terminal 111, and a process for communicating with the secure box 14 and the like.

For example, the application server 11 and the service platform 12 may be included in a single management server 10 or may be disposed in more servers in a distributed manner. The application server 11 and the service platform 12 may have various system configurations. In the following description, the application server 11 and the service platform 12 are sometimes referred to simply as the management server 10 without distinction from each other.

The relay server 13 is, for example, a system including a computer or a plurality of computers connected to the communication network 2. The relay server 13 relays communication between the information terminal 111 and the secure box 14. The relay server 13 (or the functions of the relay server 13) may be included in the management server 10.

The secure box (communication apparatus) 14 is, for example, a communication apparatus having a computer configuration and a communication function. The secure box 14 connects to the relay server 13 under the control of the management server 10 to implement remote access from the information terminal 111 to the server apparatus 101 connected to the local network 100. For example, the secure box 14 may have the functions of a router or a firewall, or may be disposed separately from a router or a firewall. The functions of the secure box 14 may be included in an information processing apparatus such as the server apparatus 101.

Overview of Connection Process

In the system configuration described above, for example, a user who uses the information terminal 111 accesses a predetermined web page provided by the application server 11 by using the web browser or the like to use a web service provided by the server apparatus 101. For example, the user selects a web service provided by the server apparatus 101 from the web page. As a result, the user is able to request a connection to the web service provided by the server apparatus 101.

In response to receipt of a connection request from the information terminal 111, the application server 11 generates a session ID. The session ID is identification information identifying a session. Further, the application server 11 uses the service platform 12 to notify the secure box 14 of the generated session ID and to request the secure box 14 to connect to the relay server 13. The application server 11 also notifies the requesting information terminal 111 of the issued session ID.

In response to the request from the management server 10, the secure box 14 connects to the relay server 13 via encrypted first communication 3 by using the notified session ID. For example, the secure box 14 connects to the relay server 13 via the first communication 3 using WebSocket over Hypertext Transfer Protocol Secure (HTTPS) (hereinafter referred to as wws).

The information terminal 111 connects to the relay server 13 via encrypted second communication 4 by using the session ID notified by the management server 10. For example, the information terminal 111 connects to the relay server 13 via the second communication 4 using wws.

The relay server 13 performs a relay between the first communication 3 and the second communication 4, which are connected to the relay server 13 using the same session ID (connection information). For example, the relay server 13 performs tunneling between the first communication 3 and the second communication 4 to communicably connect the information terminal 111 and the secure box 14 to each other.

Through the process described above, the information terminal 111 is capable of connecting to the secure box 14 via WebSocket Secure (wss). The secure box 14 has the functions of a proxy server, and the information terminal 111 can use the functions of a proxy server provided by the secure box 14 to access a web service provided by the server apparatus 101.

Through the process described above, the information terminal 111 is capable of using the functions of a proxy server provided by the secure box 14, via the relay server 13, in a manner similar to that of, for example, an information terminal connected to the local network 100. Accordingly, the communication system 1 according to this embodiment allows a user to easily use a web service provided by a web server (the server apparatus 101) connected to the local network 100 from a web browser of an accessing terminal (the information terminal 111) connectable to the Internet.

Hardware Configuration

Figure 2:
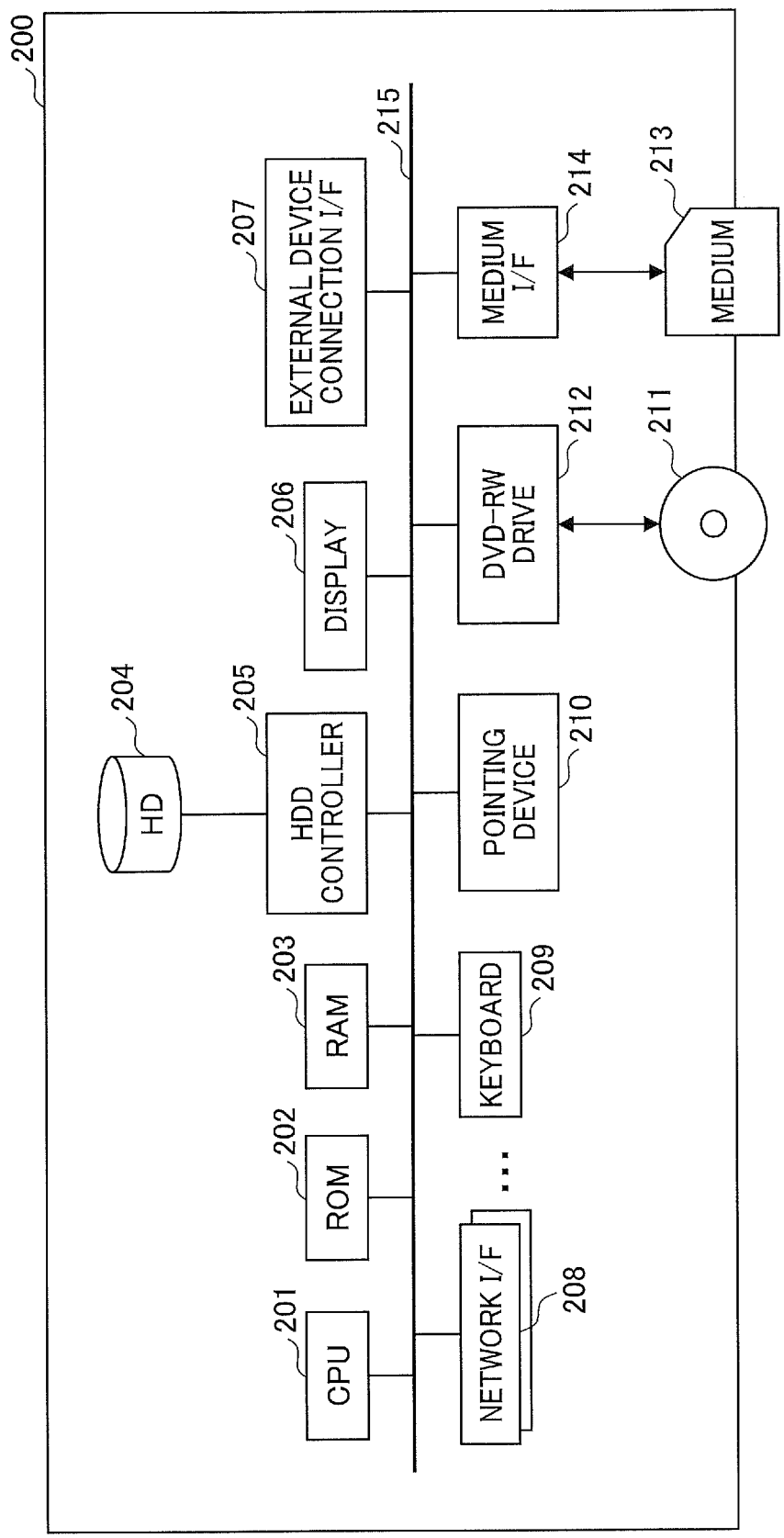
FIG. 2 is a block diagram illustrating an example hardware configuration of a computer according to an embodiment.

The information terminal 111 and the secure box 14 have, for example, the hardware configuration of a computer 200 illustrated in FIG. 2. The management server 10, the application server 11, the service platform 12, the relay server 13, the server apparatus 101, and the like are each implemented by one or more computers 200.

FIG. 2 is a block diagram illustrating an example hardware configuration of the computer 200 according to an embodiment. For example, as illustrated in FIG. 2, the computer 200 includes a central processing unit (CPU) 201, a read only memory (ROM) 202, a random access memory (RAM) 203, a hard disk (HD) 204, a hard disk drive (HDD) controller 205, a display 206, an external device connection interface (I/F) 207, one or more network I/Fs 208, a keyboard 209, a pointing device 210, a digital versatile disk rewritable (DVD-RW) drive 212, a medium I/F 214, and a bus line 215.

The CPU 201 controls the overall operation of the computer 200. The ROM 202 stores, for example, a program used to activate the computer 200, such as an initial program loader (IPL). The RAM 203 is used as, for example, a work area or the like for the CPU 201. The HD 204 stores, for example, programs such as an operating system (OS), an application, and a device driver, and various data. The HDD controller 205 controls reading or writing of various data from or to the HD 204 under the control of the CPU 201, for example.

The display 206 displays, for example, various types of information such as a cursor, a menu, a window, text, or an image. The display 206 may be disposed outside the computer 200. The external device connection I/F 207 is an interface for connecting various external devices to the computer 200. The one or more network I/Fs 208 are an interface or interfaces for performing data communication using, for example, the communication network 2, the local network 100, the remote network 110, or the like.

The keyboard 209 is a type of input device provided with a plurality of keys for entering text, numerical values, or various instructions, for example. The pointing device 210 is a type of input device for selecting or executing various instructions, selecting a target for processing, or moving the cursor being displayed, for example. The keyboard 209 and the pointing device 210 may be disposed outside the computer 200.

The DVD-RW drive 212 controls reading or writing of various data from or to a DVD-RW 211, which is an example of a removable recording medium. The DVD-RW 211 may be any other removable recording medium, instead of a DVD-RW. The medium I/F 214 controls reading or writing (storing) of data from or to a medium 213 such as a flash memory. The bus line 215 includes an address bus, a data bus, various control signals, and the like for electrically connecting the components described above.

The configuration of the computer 200 illustrated in FIG. 2 is an example. The computer 200 may have any other configuration including, for example, the CPU 201, the ROM 202, the RAM 203, the one or more network I/Fs 208, and the bus line 215.

Functional Configuration

Next, the functional configuration of the apparatuses related to the communication system 1 will be described.

First Embodiment

Functional Configuration of Management Server

Figure 3B:
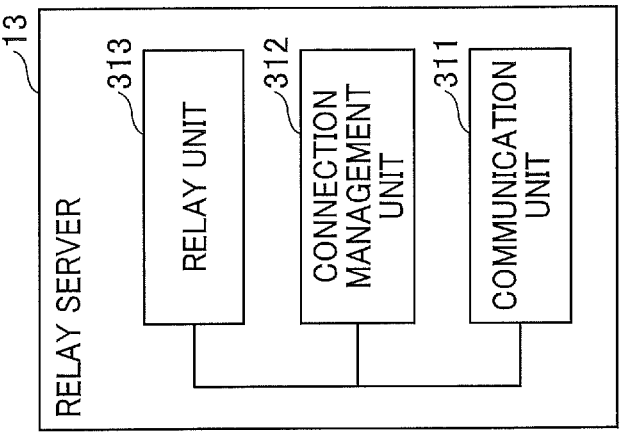
FIGS. 3A and 3B are diagrams illustrating an example functional configuration of a management server and a relay server, respectively, according to a first embodiment.
Figure 3A:
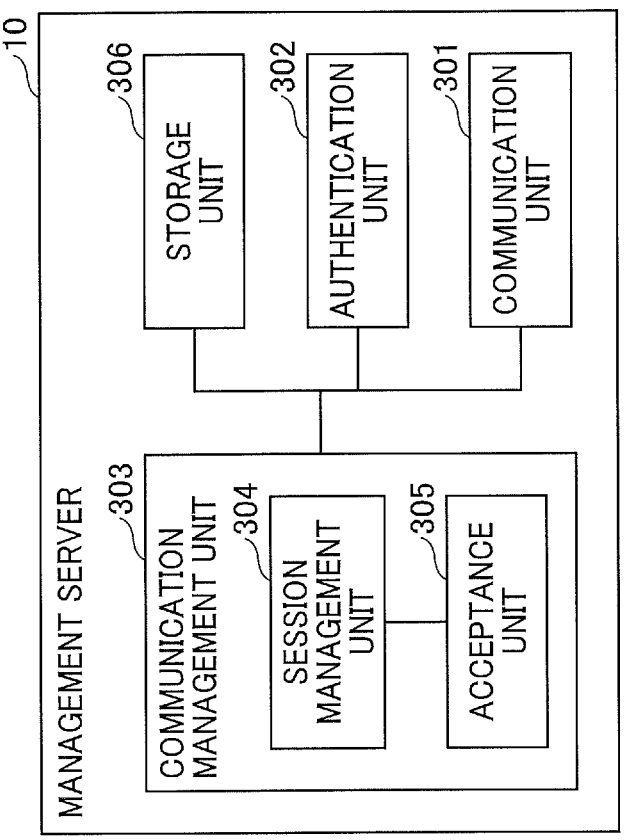

FIG. 3A illustrates an example functional configuration of the management server 10 according to a first embodiment. In the management server 10, the one or more computers 200 execute a predetermined program to implement, for example, a communication unit 301, an authentication unit 302, a communication management unit 303, and a storage unit 306. At least some of the functions described above may be implemented by hardware.

For example, the communication unit 301 performs a communication process for connecting the management server 10 to the communication network 2 using the one or more network I/Fs 208 to communicate with another apparatus.

The authentication unit 302 is implemented by, for example, a program executed by the computer 200 included in the service platform 12, and performs an authentication process for authenticating whether a user who uses the information terminal 111 is an authorized user.

The communication management unit 303 is implemented by, for example, a program executed by the computer 200 included in the application server 11. The communication management unit 303 performs a communication management process for accepting, for example, a connection request from the information terminal 111 via the communication network (first network) 2 to connect to a web service provided by the server apparatus 101 connected to the local network 100. For example, as illustrated in FIG. 3A, the communication management unit 303 includes an acceptance unit 305 and a session management unit 304.

For example, the acceptance unit 305 uses the communication system 1 to provide, to the information terminal 111, a web page or the like for accessing (connecting to) a web service provided by the server apparatus 101 in the local network 100. Further, the acceptance unit 305 provides, to the information terminal 111 and the like, a web application program interface (API) for using various functions provided by the management server 10.

For example, when the acceptance unit 305 accepts a connection request from the information terminal 111, the communication management unit 303 generates a session ID identifying a session for establishing communication between the information terminal 111 and the secure box 14 via the relay server 13. Further, the communication management unit 303 notifies the secure box 14 and the information terminal 111 of the generated session ID to request (instruct) the secure box 14 and the information terminal 111 to connect to the relay server 13.

In one example, the authentication unit 302 is used to perform user authentication, and, if the user who uses the information terminal 111 from the connection request is transmitted is an authorized user, the communication management unit 303 requests the secure box 14 and the information terminal 111 to connect to the relay server 13.

The storage unit 306 is implemented by a program executed by the one or more computers 200 and is implemented by a storage device such as the HD 204. The storage unit 306 stores various types of information such as user information including, for example, authentication information of a user registered in the communication system 1, and setting information of the communication system 1.

Functional Configuration of Relay Server

FIG. 3B illustrates an example functional configuration of the relay server 13 according to the first embodiment. In the relay server 13, for example, the one or more computers 200 execute a predetermined program to implement a communication unit 311, a connection management unit 312, a relay unit 313, and the like. At least some of the functions described above may be implemented by hardware.

For example, the communication unit 311 performs a communication process for connecting the relay server 13 to the communication network 2 using the one or more network I/Fs 208 to communicate with another apparatus.

The connection management unit 312 performs a connection management process for managing the connection of the information terminal 111 and the secure box 14, which are requested to connect to the relay server 13, to the relay server 13. In one example, the authentication unit 302 is used to perform user authentication, and, if the user who uses the information terminal 111 from the connection request is transmitted is an authorized user, the connection management unit 312 permits the information terminal 111 to connect to the relay server 13.

The relay unit 313 relays communication between the information terminal 111 and the secure box 14, which are connected to the relay server 13. For example, the relay unit 313 establishes a tunnel between the first communication 3 established with the secure box 14 and the second communication 4 established with the information terminal 111, using the same session ID, to perform a relay between the first communication 3 and the second communication 4.

Functional Configuration of Secure Box

Figure 4:
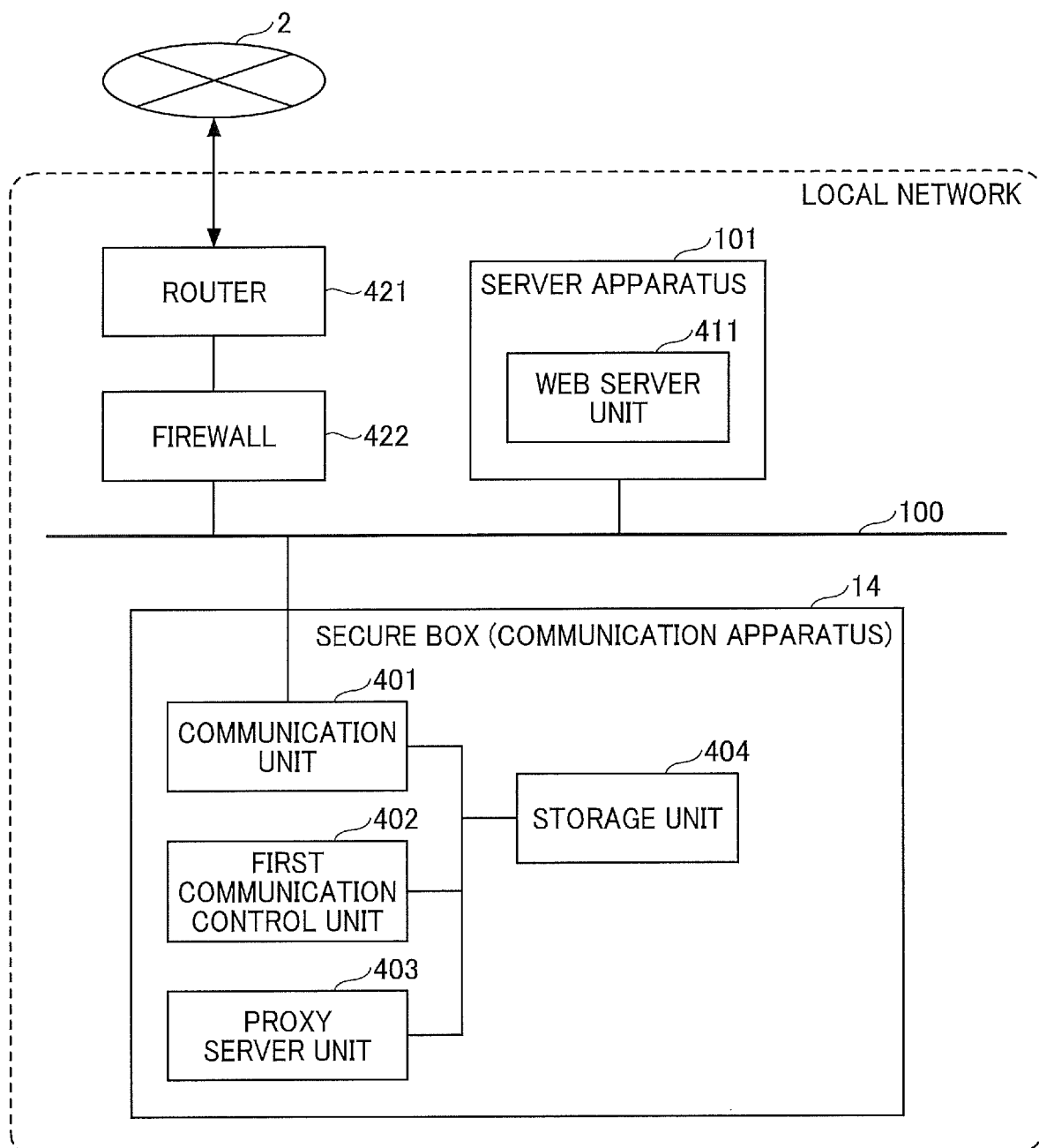
FIG. 4 is a diagram illustrating an example functional configuration of a communication apparatus according to the first embodiment.

FIG. 4 is a diagram illustrating an example functional configuration of a communication apparatus according to the first embodiment. The functions of the secure box 14 may not necessarily be included in the secure box 14 and may be included in, for example, an information processing apparatus such as the server apparatus 101. In this embodiment, the secure box 14 and an information processing apparatus having the function of the secure box 14 are referred to as "communication apparatus". An example functional configuration of the communication apparatus, which is the secure box 14, will be described with reference to FIG. 4.

In the example illustrated in FIG. 4, the local network 100 is connected to the communication network 2 via a router 421 and a firewall 422. However, this is an example, and the functions of the router 421 and the firewall 422 may be included in the secure box 14, for example. In the example illustrated in FIG. 4, furthermore, the server apparatus 101 is connected to the local network 100. The server apparatus 101 includes a web server unit 411 that functions as a web server for providing predetermined web services for systems such as a business system and an attendance management system, for example.

In the secure box (communication apparatus) 14, for example, the computer 200 included in the secure box 14 executes a predetermined program to implement a communication unit 401, a first communication control unit 402, a proxy server unit 403, a storage unit 404, and the like. At least some of the functions described above may be implemented by hardware.

For example, the communication unit 401 performs a communication process for connecting the secure box 14 to the local network 100 or the like using the one or more network I/Fs 208 to communicate with another apparatus.

The first communication control unit 402 is communicably connected to the management server 10. In response to a request from the communication management unit 303 of the management server 10, the first communication control unit 402 connects to the relay server 13 from the local network (second network) 100 via the encrypted first communication 3. For example, the first communication control unit 402 uses the session ID notified by the management server 10 to send a request for a WebSocket connection to the relay server 13.

The proxy server unit 403 functions as a proxy server in the local network 100, which can be used from the information terminal 111, by using a communication path (wws tunnel) established between the first communication control unit 402 and the information terminal 111 via the relay server 13.

The storage unit 404 is implemented by a program executed by the computer 200 included in the secure box 14 and is implemented by a storage medium such as the HD 204, for example, and stores various types of information such as setting information of the secure box 14.

Figure 5:
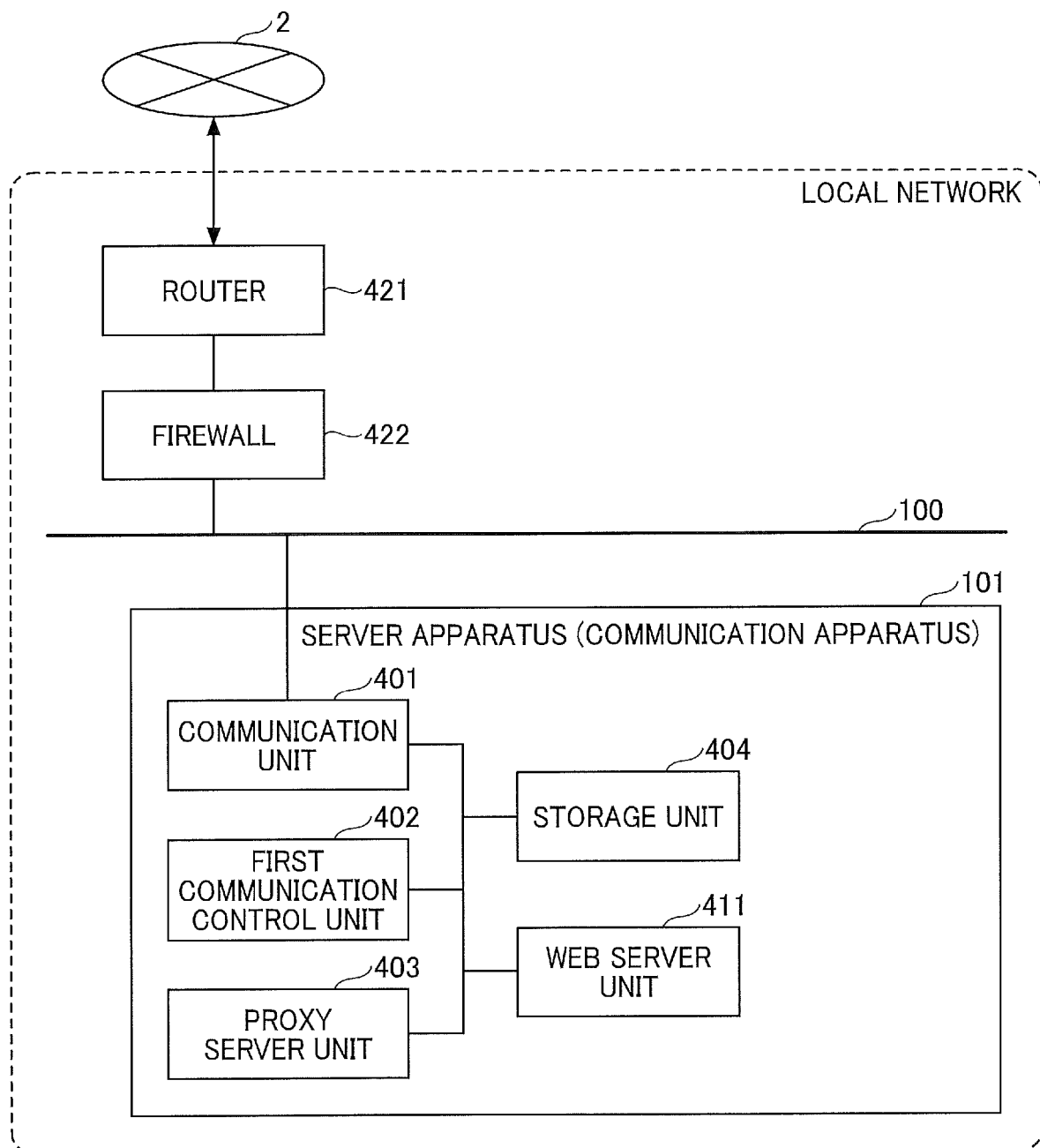
FIG. 5 is a diagram illustrating another example functional configuration of the communication apparatus according to the first embodiment.

FIG. 5 is a diagram illustrating another example functional configuration of the communication apparatus according to the first embodiment. An example functional configuration of the communication apparatus, which is the server apparatus 101, will be described with reference to FIG. 5.

In the server apparatus (communication apparatus) 101, for example, the one or more computers 200 execute a predetermined program to implement a communication unit 401, a first communication control unit 402, a proxy server unit 403, a storage unit 404, a web server unit 411, and the like. At least some of the functions described above may be implemented by hardware.

The communication unit 401, the first communication control unit 402, the proxy server unit 403, and the storage unit 404 are similar to the communication unit 401, the first communication control unit 402, the proxy server unit 403, and the storage unit 404 illustrated in FIG. 4, respectively, and the description thereof will thus be omitted.

The web server unit 411 functions as a web server for providing predetermined web services for systems such as a business system and an attendance management system, for example. As described above, the functions of the secure box 14 are implementable by various computers 200 connected to the local network 100.

Functional Configuration of Information Terminal

Figure 6:
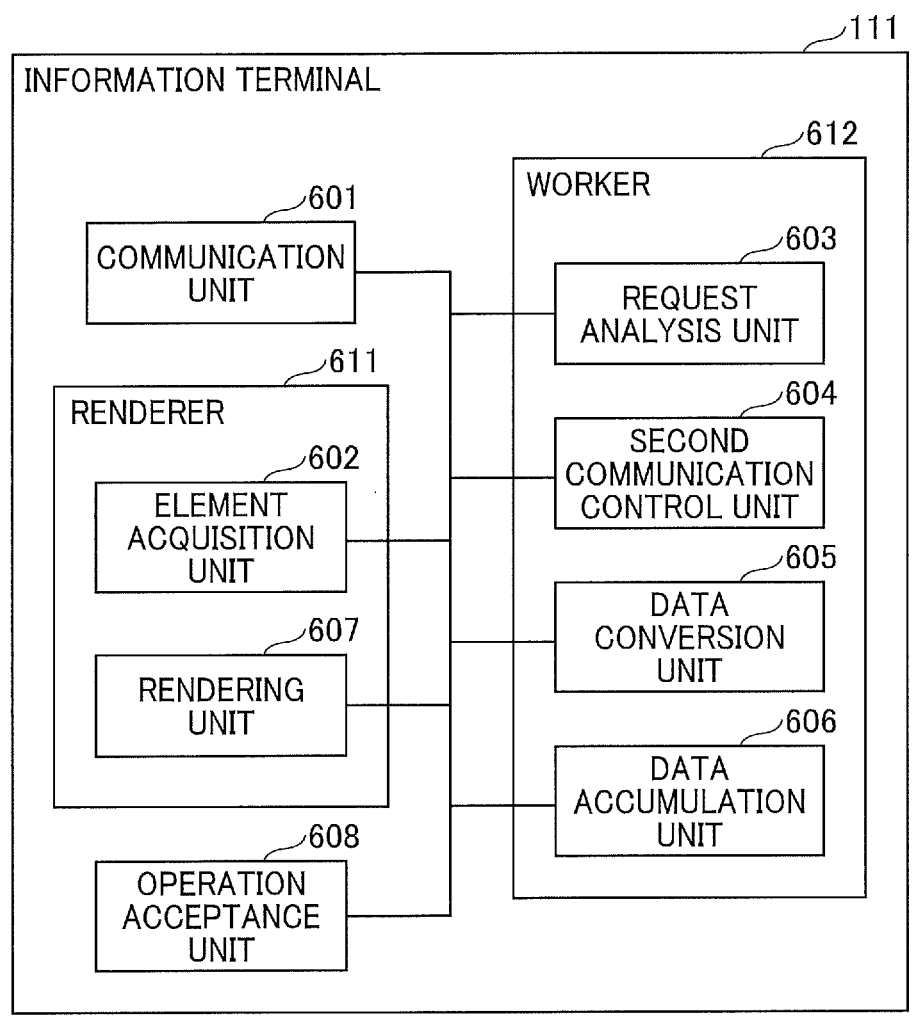
FIG. 6 is a diagram illustrating an example functional configuration of an information terminal according to the first embodiment.

FIG. 6 is a diagram illustrating an example functional configuration of the information terminal 111 according to the first embodiment. In the information terminal 111, for example, the CPU 201 executes a predetermined program to implement a communication unit 601, an element acquisition unit 602, a request analysis unit 603, a second communication control unit 604, a data conversion unit 605, a data accumulation unit 606, a rendering unit 607, and an operation acceptance unit 608.

The element acquisition unit 602 and the rendering unit 607 are implemented by a renderer 611 or the like of the web browser executed by the CPU 201. The renderer 611 is a program for interpreting the Hyper Text Markup Language (HTML) or the like of a web page and generating a Document Object Model (DOM) representing the layout of text, an image, and the like to be displayed on the screen. The renderer 611 is also referred to as, for example, an HTML rendering engine or the like.

The request analysis unit 603, the second communication control unit 604, the data conversion unit 605, and the data accumulation unit 606 are implemented by a worker 612 or the like of the web browser executed by the CPU 201. The worker 612 is a mechanism for moving the processing of a script in a web application to a thread different from the main thread to enable execution in the background, and is also referred to as a web worker, a service worker, or the like. The use of the worker 612 enables analysis of the content of a request and processing of the content of the request before the request is sent from the web browser to the web server.

For example, the communication unit 601 performs a communication process for connecting the information terminal 111 to the remote network 110, the communication network 2, and the like using the one or more network I/Fs 208 to communicate with another apparatus.

For example, the element acquisition unit 602 acquires an element such as an HTML request from the HTML of a web page. Further, the element acquisition unit 602 requests the worker 612 to acquire data used to generate a DOM, such as a Cascading Style Sheets (CSS) or JavaScript (registered trademark) file. The request analysis unit 603 analyzes a request accepted from the element acquisition unit 602.

The second communication control unit 604 uses the session ID notified by the management server 10 to request the relay server 13 to establish a connection, and connects to the relay server 13 via the encrypted second communication 4. Further, the second communication control unit 604 transmits the request analyzed by the request analysis unit 603 to the secure box 14 via the relay server 13, and outputs data received as a response to the transmitted request to the data conversion unit 605.

The data conversion unit 605 converts the format of the data accepted from the second communication control unit 604 into a format usable by the renderer 611, as appropriate, before outputting the data to the renderer 611, the data accumulation unit 606, and the like. The data accumulation unit 606 accumulates the data output from the data conversion unit 605.

The rendering unit 607 renders a display screen using data accepted from the worker 612. The rendering unit 607 constructs a DOM in this rendering operation, and requests the worker 612 to acquire data if more data is to be used. The operation acceptance unit 608 accepts an operation on the display screen displayed by the rendering unit 607.

Operation

Next, the operation of a communication control method according to the first embodiment will be described.

Login Process

Figure 7:
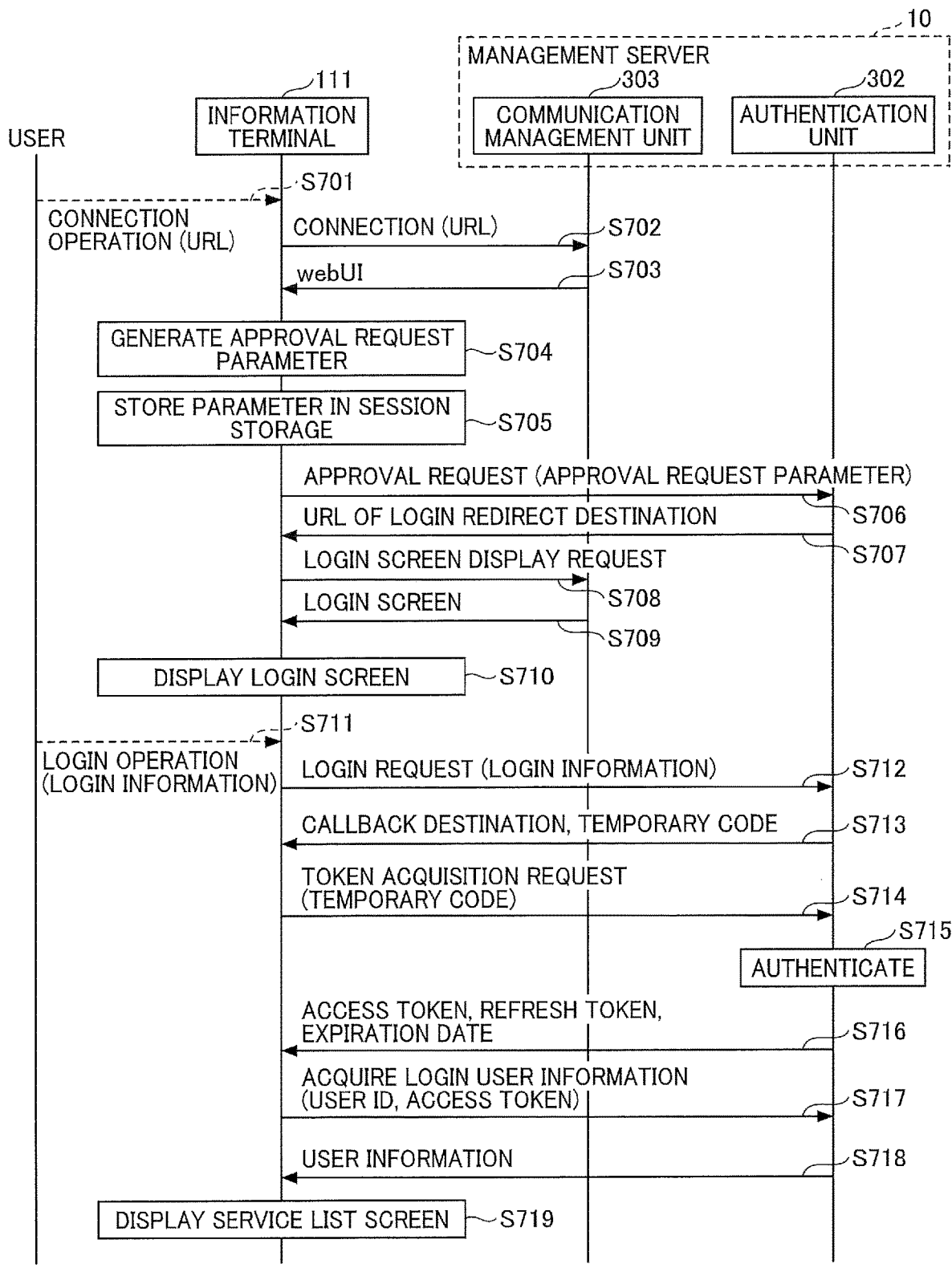
FIG. 7 is a sequence diagram illustrating an example login process according to the first embodiment.

FIG. 7 is a sequence diagram illustrating an example login process according to the first embodiment. The illustrated process is an example of a login process executed by the communication system 1 in response to a user registered in the communication system 1 logging into the management server 10 using the information terminal 111.

In step S701, the user uses the web browser of the information terminal 111 to perform a connection operation to connect to the acceptance unit 305 of the management server 10. For example, the user inputs a uniform resource locator (URL) or the like for accessing the acceptance unit 305 of the communication management unit 303 to the web browser of the information terminal 111.

In steps S702 and S703, in response to receipt of the connection operation performed by the user, the web browser of the information terminal 111 accesses the designated URL and acquires a web user interface (UI) from the acceptance unit 305 of the communication management unit 303.

In steps S704 and S705, the web browser of the information terminal 111 generates an approval request parameter and stores the generated approval request parameter in session storage. In step S706, the web browser transmits an approval request including the generated approval request parameter to the authentication unit 302 of the management server 10.

In step S707, the authentication unit 302 of the management server 10 notifies the information terminal 111 of the URL of the redirect destination of the login in response to the approval request from the information terminal 111.

In step S708, the web browser of the information terminal 111 uses the URL of the redirect destination notified by the management server 10 to request the acceptance unit 305 of the communication management unit 303 to display a login screen.

Figure 10:
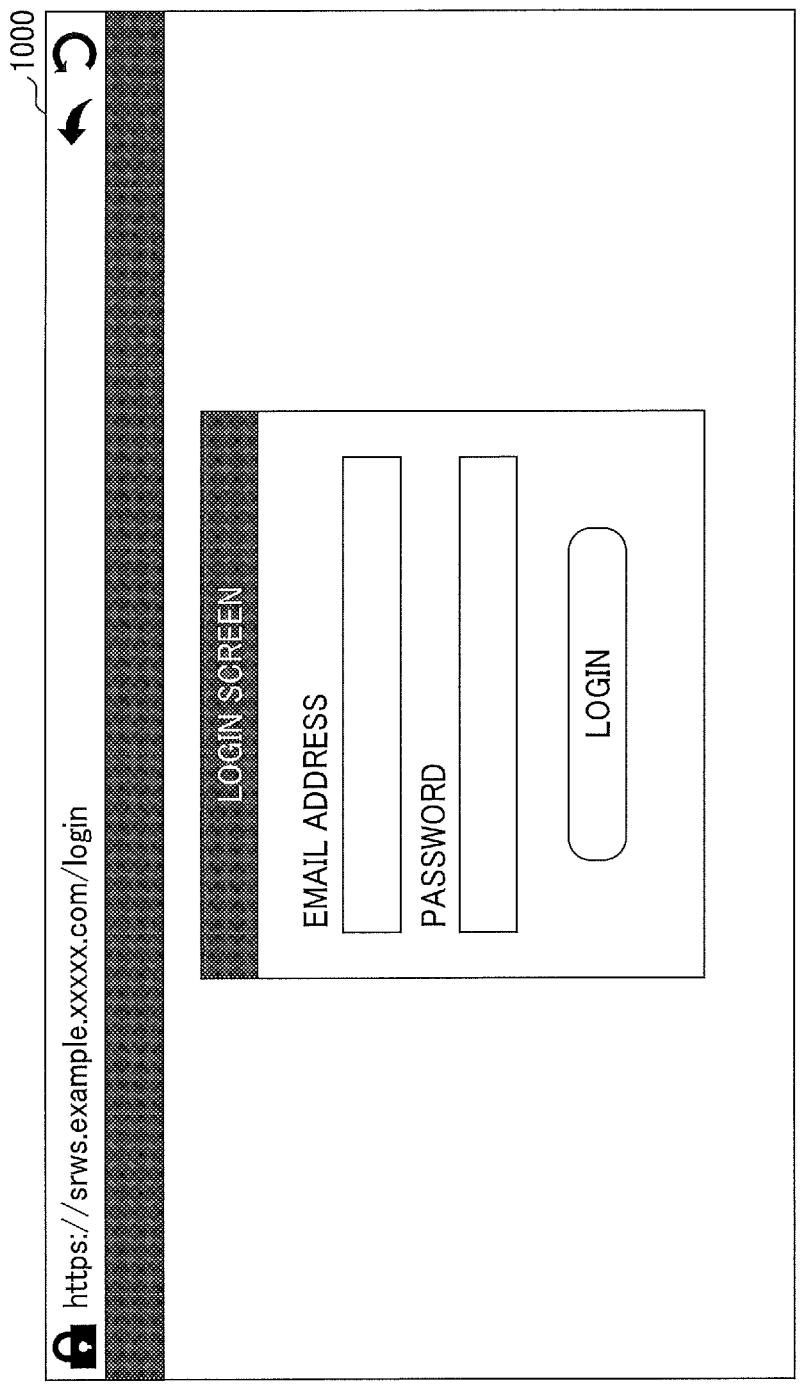
FIG. 10 is a view illustrating an example of a login screen according to the first embodiment.

In step S709, the acceptance unit 305 of the communication management unit 303 transmits the login screen to the information terminal 111. In step S710, the web browser of the information terminal 111 displays, for example, a login screen 1000 illustrated in FIG. 10.

In step S711, for example, in response to the user performing a login operation of entering login information such as an email address and a password on the login screen 1000, the communication system 1 executes the processing of step S712 and the subsequent processing. The email address and the password are examples of login information (authentication information) for authenticating the user. The login information for authenticating the user may be, for example, an electronic certificate, biological information, or identification information acquired from an object possessed by the user.

In step S712, in response to receipt of the login operation performed by the user, the web browser of the information terminal 111 transmits a login request including the entered login information to the authentication unit 302 of the management server 10.

In step S713, in response to receipt of the login request from the information terminal 111, the authentication unit 302 of the management server 10 notifies the requesting information terminal 111 of the callback destination, the temporary code, and the like.

In step S714, the web browser of the information terminal 111 transmits a token acquisition request including the temporary code notified by the management server 10 to the authentication unit 302 of the management server 10.

In step S715, the authentication unit 302 of the management server 10 authenticates the user in response to the token acquisition request from the information terminal 111. As described above, the user is a user registered in the communication system 1, and the authentication is successful (the authentication result is OK).

In step S716, the authentication unit 302 of the management server 10 notifies the information terminal 111 of information such as an access token, a refresh token, and an expiration date.

In steps S717, S718, and S719, the web browser of the information terminal 111 acquires user information from the authentication unit 302 of the management server 10 by using the user ID of the user, the notified access token, and the like, and displays a service list screen or the like by using the acquired user information.

The login process illustrated in FIG. 7 is an example. The communication system 1 may authenticate a user in a different procedure and notify the information terminal 111 of the user whose login has been permitted of an access token.

Process of Communication System

Figure 8:
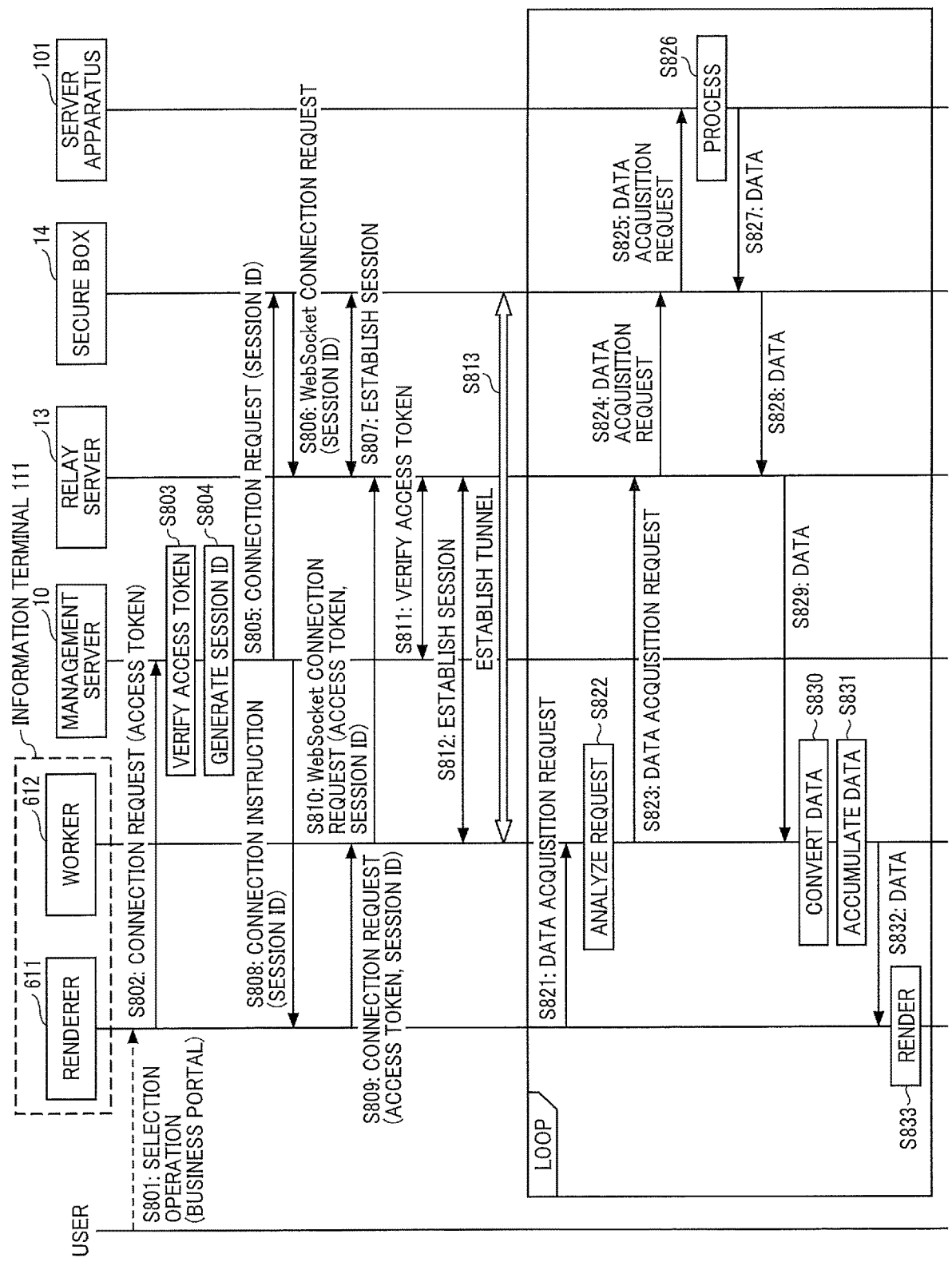
FIG. 8 is a sequence diagram illustrating an example process of a communication system according to the first embodiment.
Figure 9:
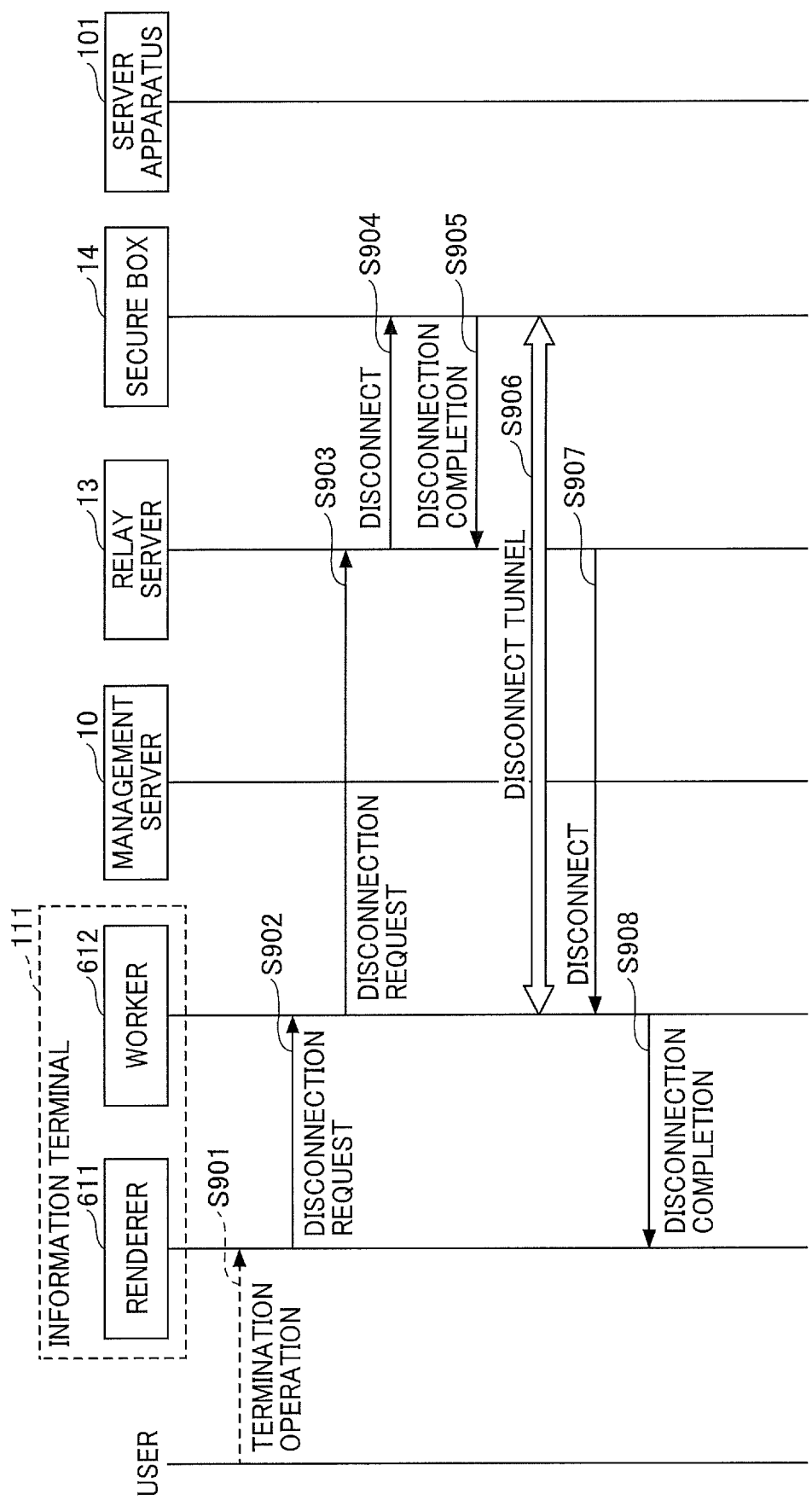
FIG. 9 is a sequence diagram illustrating an example process of the communication system according to the first embodiment.

FIGS. 8 and 9 are sequence diagrams illustrating an example process of the communication system 1 according to the first embodiment. The illustrated process is an example of a process executed by the communication system 1 when a user who uses the information terminal 111 is to use a business portal, which is an example of a web service provided by the server apparatus 101 in the local network 100.

Figure 11:
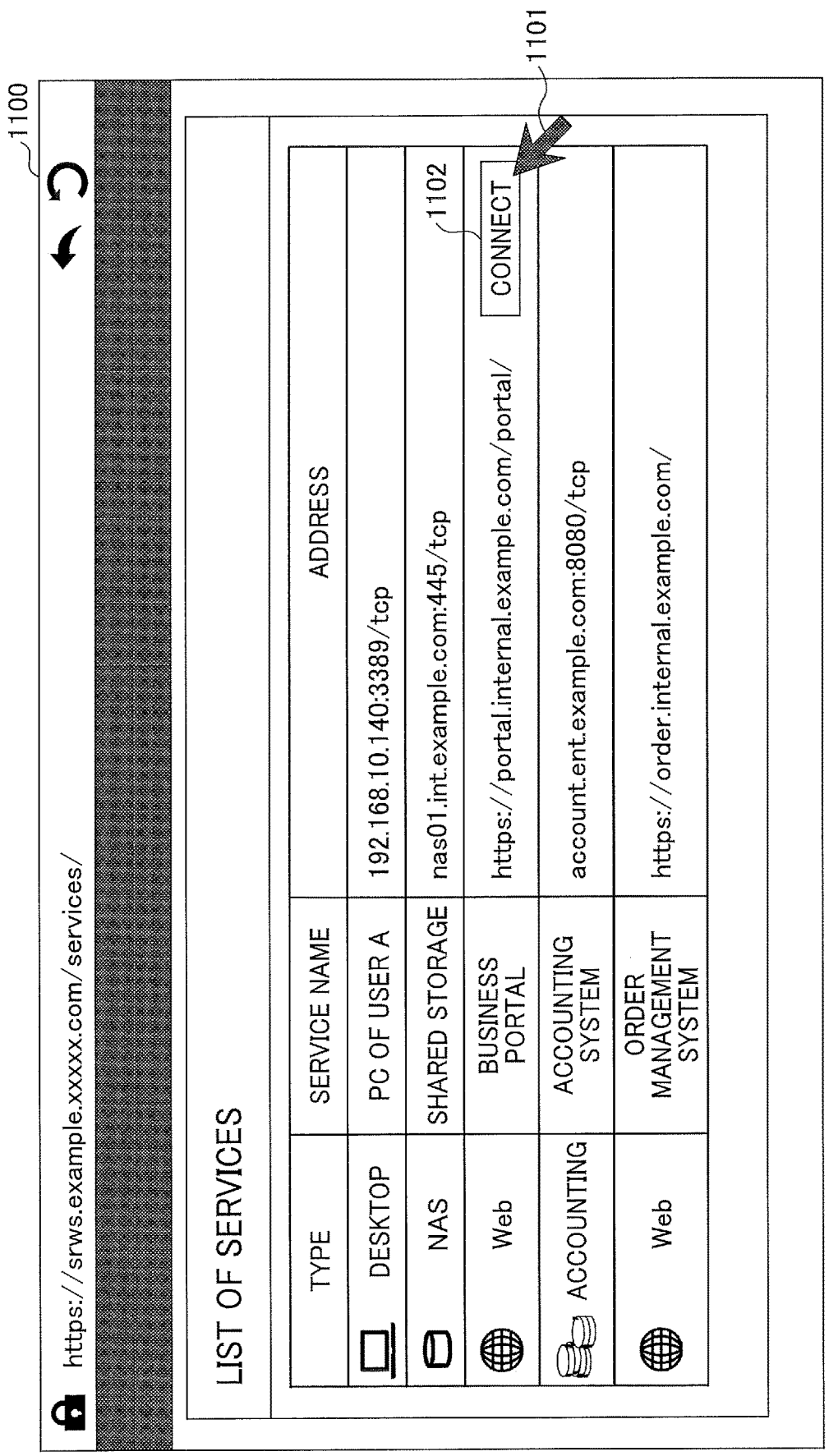
FIG. 11 is a view illustrating an example of a service list screen according to the first embodiment.

It is assumed that, at the start of the process illustrated in FIG. 8, the information terminal 111 has executed the login process illustrated in FIG. 7 and has displayed a service list screen 1100 illustrated in FIG. 11. It is also assumed that the session management unit 304 of the communication management unit 303 and the first communication control unit 402 of the secure box 14 have been communicably connected to each other in accordance with the MQTT protocol or any other suitable protocol, for example.

In step S801, the user performs an operation of selecting a business portal on the service list screen 1100 illustrated in FIG. 11. For example, the user moves a cursor 1101 to the address field of the service name "business portal" on the service list screen 1100 and selects a "Connect" button 1102 displayed in the address field.

In step S802, in response to receipt of the selection operation performed by the user, the renderer 611 of the information terminal 111 transmits a connection request including the access token acquired in the login process illustrated in FIG. 7 to the communication management unit 303 of the management server 10.

In step S803, in response to receipt of the connection request from the information terminal 111, the communication management unit 303 of the management server 10 verifies the access token included in the connection request using the authentication unit 302. If the result of the verification of the access token is "OK" (if the user is an authorized user), in step S804, the communication management unit 303 generates a session ID identifying a session. On the other hand, if the result of the verification of the access token is not "OK", for example, the communication management unit 303 notifies the information terminal 111 of an error and stops the execution of the processing of step S804.

In step S805, the communication management unit 303 of the management server 10 transmits to the secure box 14 a request for connecting to the relay server 13. The request includes the issued session ID.

In step S806, the first communication control unit 402 of the secure box 14 transmits to the relay server 13 a Web-Socket connection request including the session ID notified by the management server 10.

In step S807, in response to receipt of the connection request from the secure box 14, the connection management unit 312 of the relay server 13 establishes a session of the encrypted first communication 3 based on wws, for example, with the secure box 14 from which the connection request is received.

In step S808, the communication management unit 303 of the management server 10 transmits a connection instruction including the session ID generated in step S804 to the information terminal 111 from which the connection request is received.

In step S809, the renderer 611 of the information terminal 111 requests the worker 612 to connect to the relay server 13.

In step S810, the second communication control unit 604 of the worker 612 transmits a WebSocket connection request to the relay server 13. The WebSocket connection request includes, for example, the access token acquired in the login process illustrated in FIG. 7 and the session ID notified by the management server 10.

In step S811, in response to receipt of the WebSocket connection request from the information terminal 111, the connection management unit 312 of the relay server 13 verifies the access token included in the WebSocket connection request using the authentication unit 302 of the management server 10. If the result of the verification of the access token is "OK" (if the user is an authorized user), in step S812, the connection management unit 312 of the relay server 13 establishes a session of the encrypted second communication 4 based on wws, for example, with the information terminal 111. As a result, the information terminal 111 and the secure box 14 participate in the same session provided by the relay server 13, and a tunnel that allows the information terminal 111 and the secure box 14 to transmit and receive data to and from each other via encrypted communication (e.g., wss) is established (step S813).

On the other hand, if the result of the verification of the access token is not "OK", the connection management unit 312 of the relay server 13 stops the execution of the processing of step S812 and rejects the connection to the relay server 13 (or discards the WebSocket connection request).

Figure 12:
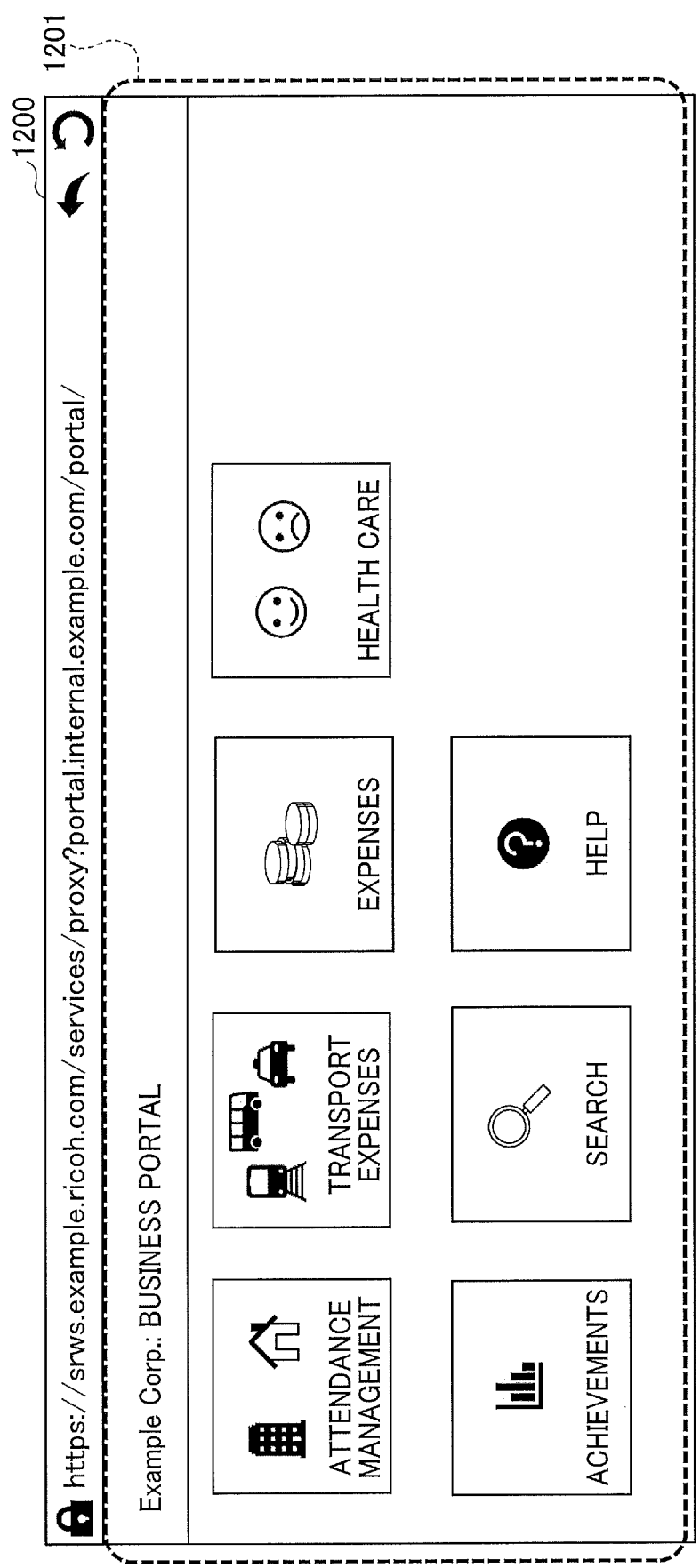
FIG. 12 is a view illustrating an example of an operation page screen according to the first embodiment.

The process described above enables the web browser of the information terminal 111 to use the proxy server unit 403 of the secure box 14 to access a web service such as a business portal provided by the server apparatus 101 connected to the local network 100. For example, the web browser of the information terminal 111 repeatedly executes the processing of steps S821 to S833 illustrated in FIG. 8. As a result, as illustrated in FIG. 12, the web browser of the information terminal 111 is capable of displaying a business portal screen 1201 provided by the server apparatus 101 on an operation page screen 1200.

For example, to display the business portal screen 1201 provided by the server apparatus 101, the renderer 611 of the information terminal 111 generates an HTTPS request and requests the worker 612 to acquire data (step S821).

The worker 612 analyzes the request accepted from the renderer 611 (step S822). If it is determined that communication with the server apparatus 101 is to be performed, the worker 612 transmits a data acquisition request to the proxy server unit 403 of the secure box 14 via the relay server 13 (steps S823 and S824). If the requested data has been accumulated in the data accumulation unit 606, the worker 612 may return the data accumulated in the data accumulation unit 606 to the renderer 611.

In response to receipt of the data acquisition request from the information terminal 111, the proxy server unit 403 of the secure box 14 transfers the data acquisition request to the server apparatus 101 in a manner similar to that in response to receipt of the data acquisition request from a terminal in the local network 100 (step S825).

In response to receipt of the data acquisition request, the server apparatus 101 transmits data such as HTML data to the secure box 14 as a response (steps S826 and S827).

In response to receipt of the response from the server apparatus 101, the proxy server unit 403 of the secure box 14 changes the format of the response to a format interpretable by the worker 612, as appropriate, before transmitting the response to the information terminal 111 (steps S828 and S829). For example, if the proxy server unit 403 may not be able to provide the functions using an absolute URL, the proxy server unit 403 may convert the absolute URL into a relative URL.

The worker 612 of the information terminal 111 changes the format of the data received from the secure box 14 to a format interpretable by the renderer 611, as appropriate, before accumulating the data (steps S830 and S831). Further, the worker 612 notifies the renderer 611 of the data.

The renderer 611 uses the data notified by the worker 612 to display, for example, as illustrated in FIG. 12, the business portal screen 1201 provided by the server apparatus 101 on the operation page screen 1200.

FIG. 13 illustrates an example page configuration of an operation page according to the first embodiment. A page configuration 1300 illustrated in FIG. 13 indicates, for example, HTML data for displaying the operation page screen 1200 illustrated in FIG. 12.

In the example illustrated in FIG. 13, the data acquired by the worker 612 is inserted into the element portion "id="target"" of a rendering area 1301. The inserted data is integrated into one DOM and is thus not restricted by the security protection mechanism of the web browser. While the example illustrated in FIG. 13 presents the page configuration 1300 in simple HTML, the page configuration 1300 may be more complex or may be expressed in a format other than HTML.

The transmission and reception of the request and the response between the worker 612 and the server apparatus 101, which are illustrated in steps S821 to S833 in FIG. 8, continue until the communication is terminated.

An example process for terminating communication will be described with reference to FIG. 9.

In step S901, in response to the user performing a termination operation on the web browser of the information terminal 111, the communication system 1 executes the processing of step S902 and the subsequent processing.

In step S902, in response to receipt of the termination operation performed by the user, the renderer 611 of the information terminal 111 requests the worker 612 to disconnect communication. In response to the request, in step S903, the worker 612 transmits a disconnection request to the relay server 13.

In steps S904 and S905, the connection management unit 312 of the relay server 13 disconnects the session with the secure box 14. As a result, in step S906, the tunnel established in step S813 in FIG. 8 is disconnected.

In step S907, the connection management unit 312 of the relay server 13 disconnects the session with the information terminal 111. In response to the disconnection, in step S908, the worker 612 notifies the renderer 611 that the disconnection of the session with the relay server 13 is completed.

Data Flow

Figure 14:
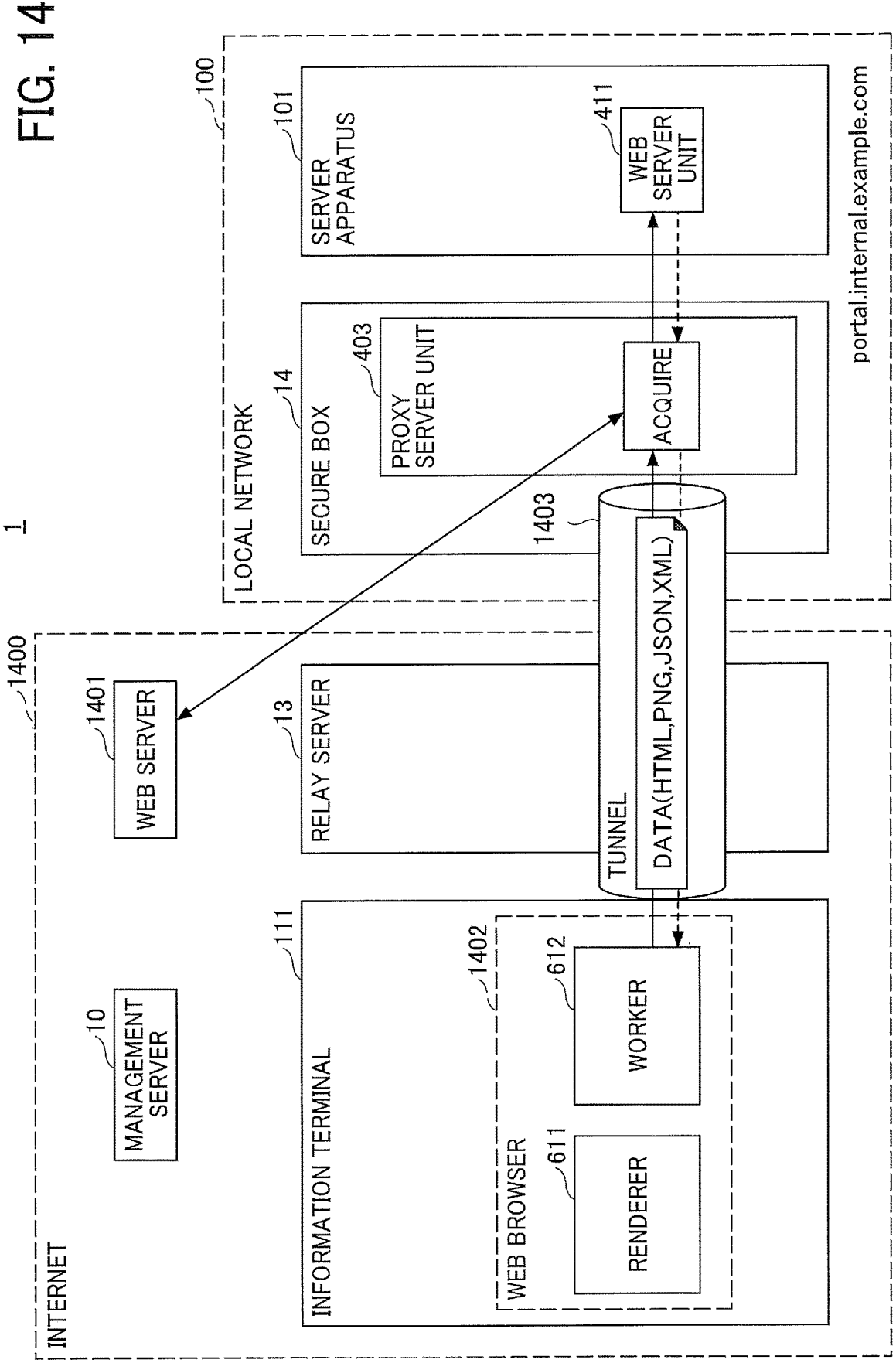
FIG. 14 is a diagram illustrating a data flow after the establishment of a tunnel according to the first embodiment.

FIG. 14 is a diagram illustrating a data flow after the establishment of a tunnel according to the first embodiment. In FIG. 14, the state of the communication system 1 is illustrated in which, for example, a tunnel 1403 using wws communication is established between the worker 612 and the secure box 14 in step S813 illustrated in FIG. 8. The tunnel 1403 is an example of a first communication path between the first communication control unit 402 and the second communication control unit 604, and includes a communication path based on WebSocket.

The worker 612 is capable of transmitting and receiving data in various formats such as HTML, Portable Network Graphics (PNG), JavaScript Object Notation (JSON), and Extensible Markup Language (XML) using the tunnel 1403. This enables the information terminal 111 to use, for example, the proxy server unit 403 included in the secure box 14 in a manner similar to that of a terminal connected to the local network 100.

For example, the worker 612 is capable of accessing a web service provided by the web server unit 411 of the server apparatus 101 by using the proxy server unit 403. The worker 612 is also capable of accessing a web server 1401 on the Internet 1400 by using the proxy server unit 403.

As described above, the first embodiment allows a user to easily use a web service provided by a web server (the server apparatus 101) connected to the local network 100 from a web browser of an accessing terminal (the information terminal 111) connectable to the Internet.

Second Embodiment

A second embodiment describes an example of a communication system 1 in which Proxy-PAC technology is used instead of the worker 612 of the web browser of the information terminal 111.

Functional Configuration

Functional Configuration of Management Server

Figure 15B:
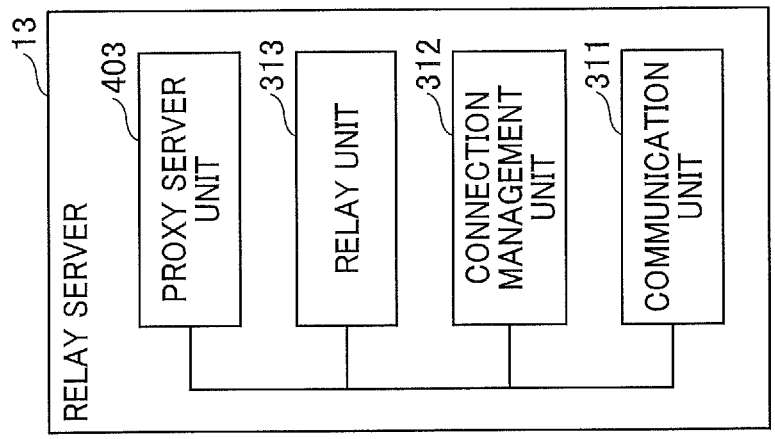
FIGS. 15A and 15B are diagrams illustrating an example functional configuration of a management server and a relay server, respectively, according to a second embodiment.
Figure 15A:
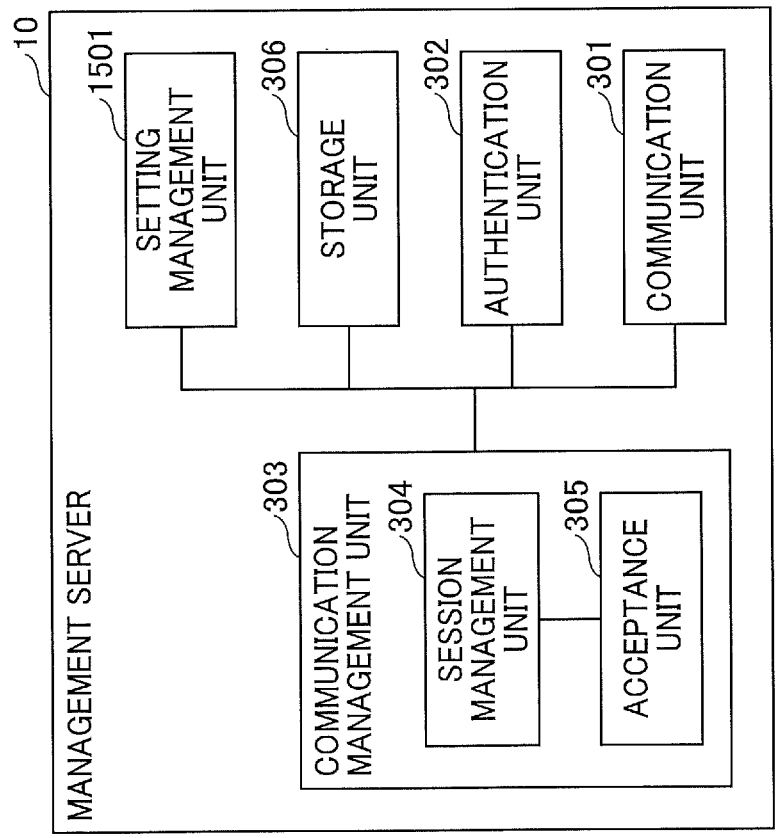

FIG. 15A illustrates an example functional configuration of a management server 10 according to the second embodiment. For example, the management server 10 according to the second embodiment includes a setting management unit 1501 in addition to the functional configuration of the management server 10 according to the first embodiment illustrated in FIG. 3A.

The setting management unit 1501 is implemented by, for example, a program executed by the computer 200 included in the management server 10, and manages setting information defined in, for example, a Proxy-PAC file 1900 illustrated in FIG. 19 described below. Further, the setting management unit 1501 provides information for acquiring the Proxy-PAC file 1900 to the information terminal 111 or the like.

Functional Configuration of Relay Server

FIG. 15B illustrates an example functional configuration of a relay server 13 according to the second embodiment. For example, the relay server 13 according to the second embodiment includes a proxy server unit 403 in addition to the functional configuration of the relay server 13 according to the first embodiment illustrated in FIG. 3B.

The proxy server unit 403 is implemented by, for example, a program executed by the computer 200 included in the relay server 13. The proxy server unit 403 has functions similar to those of the proxy server unit 403 included in the secure box 14 according to the first embodiment.

Functional Configuration of Secure Box

Figure 16:
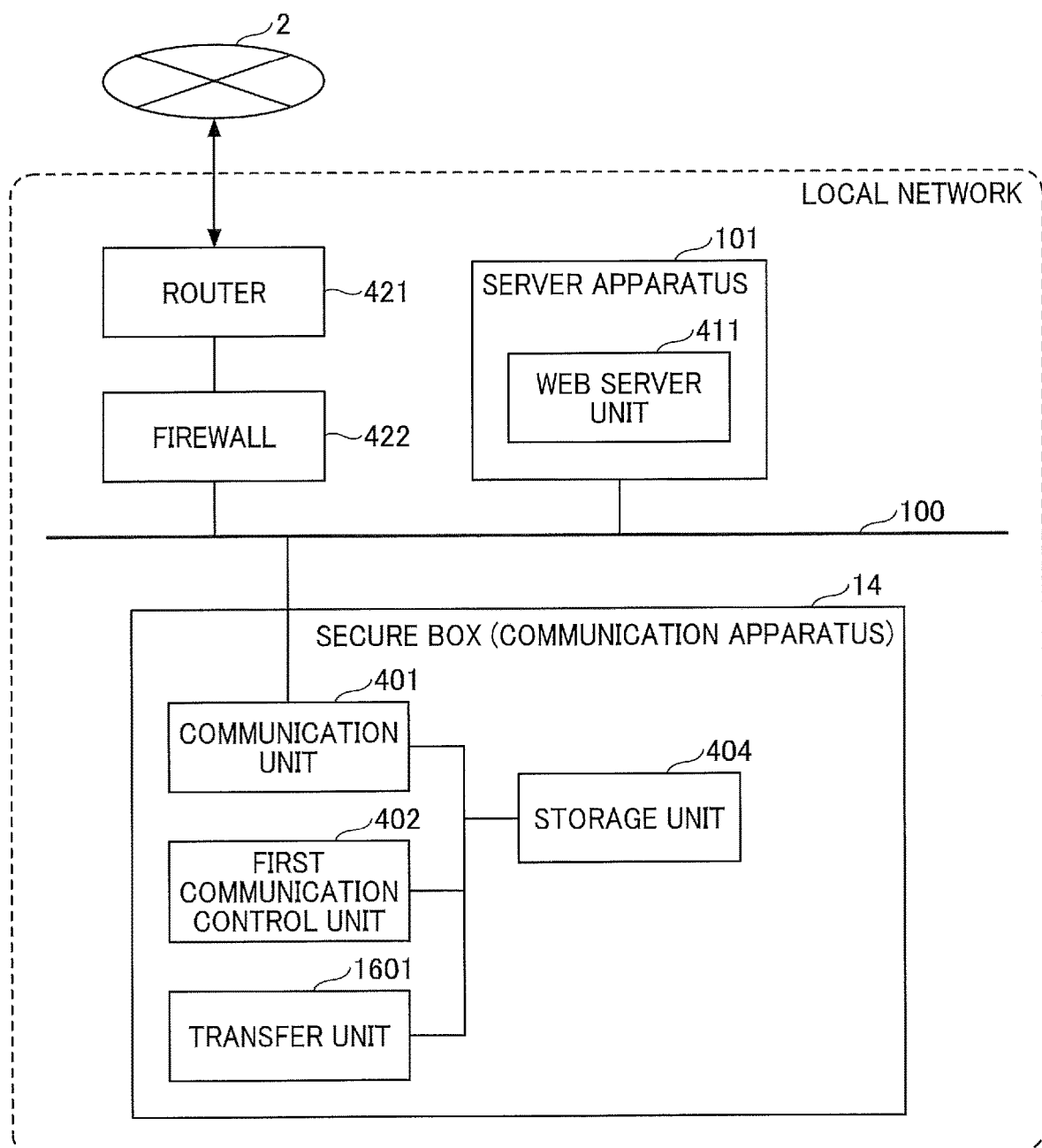
FIG. 16 is a diagram illustrating an example functional configuration of a secure box according to the second embodiment.

FIG. 16 is a diagram illustrating an example functional configuration of a secure box 14 according to the second embodiment. The secure box 14 according to the second embodiment includes a transfer unit 1601 instead of the proxy server unit 403 included in the secure box 14 according to the first embodiment illustrated in FIG. 4.

The transfer unit 1601 is implemented by, for example, a program executed by the computer 200 included in the secure box 14. The transfer unit 1601 functions as a transmission control protocol (TCP) relay for bidirectional transfer of data to be transmitted and received between the relay server 13 and the server apparatus 101.

Functional Configuration of Information Terminal

Figure 17:
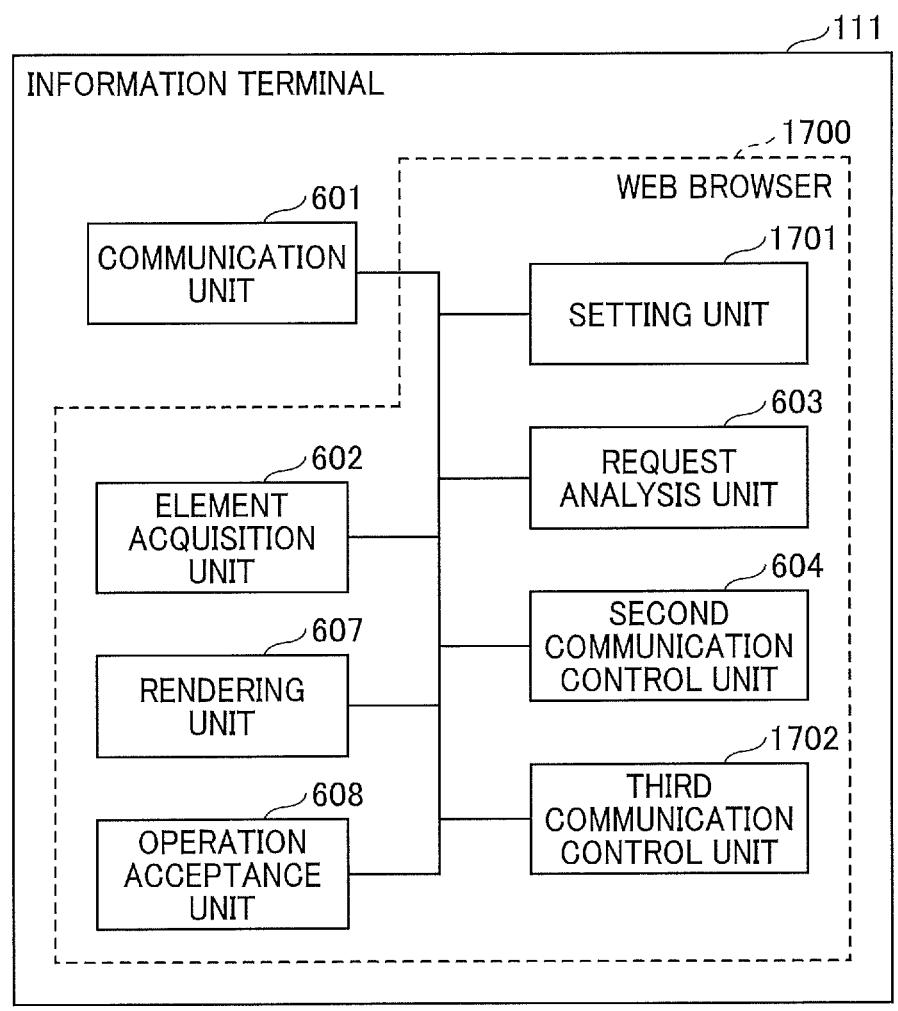
FIG. 17 is a diagram illustrating an example functional configuration of an information terminal according to the second embodiment.

FIG. 17 is a diagram illustrating an example functional configuration of an information terminal 111 according to the second embodiment. The information terminal 111 according to the second embodiment includes, for example, a communication unit 601, an element acquisition unit 602, a request analysis unit 603, a second communication control unit 604, a rendering unit 607, an operation acceptance unit 608, a setting unit 1701, and a third communication control unit 1702. At least some of the functions described above may be implemented by hardware.

The communication unit 601 is implemented by, for example, a program (such as an OS) executed by the CPU 201. The communication unit 601 performs a communication process for connecting the information terminal 111 to the remote network 110, the communication network 2, and the like using the one or more network I/Fs 208 to communicate with another apparatus.

The setting unit 1701 is implemented by, for example, a web browser 1700 executed by the CPU 201. The setting unit 1701 acquires, for example, the Proxy-PAC file 1900 illustrated in FIG. 19 from the management server 10 and applies the Proxy-PAC file 1900 to the web browser 1700. Further, the setting unit 1701 displays, for example, a setting screen 1800 illustrated in FIG. 18A and accepts the setting of the source from which the Proxy-PAC file 1900 is acquired.

Figure 18A:
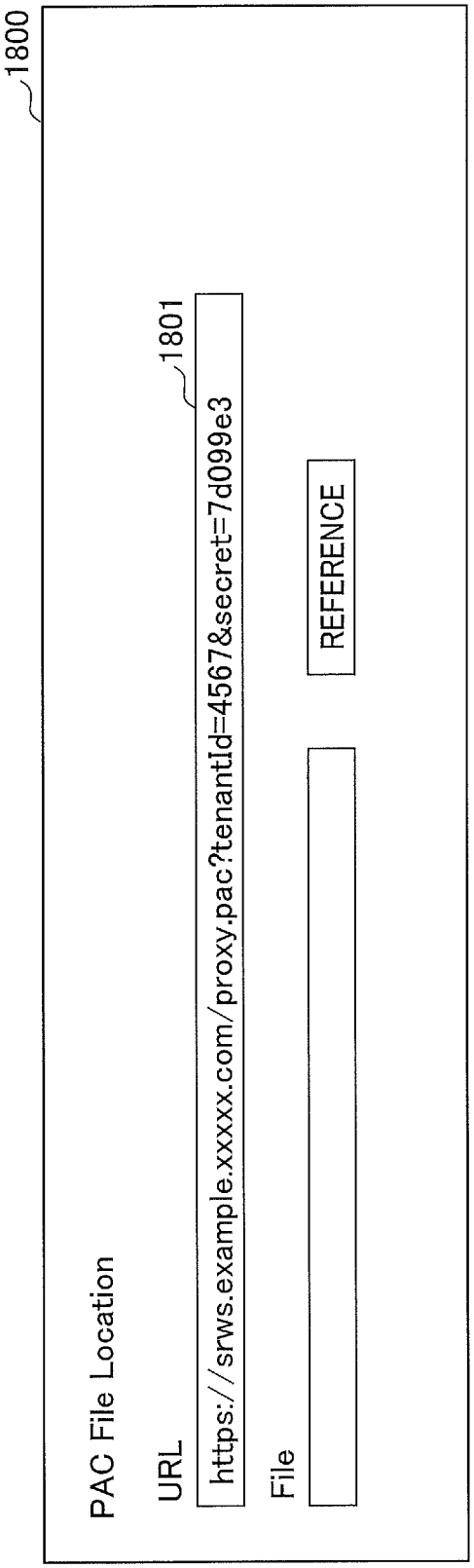
FIGS. 18A and 18B illustrate settings of a web browser according to the second embodiment.
Figure 18B:

FIGS. 18A and 18B illustrate settings of the web browser 1700 according to the second embodiment. The user who uses the information terminal 111 is able to use, for example, the setting screen 1800 of the web browser 1700 illustrated in FIG. 18A to set the source from which the Proxy-PAC file 1900 is acquired.

However, the web browser 1700 is not allowed to use the authentication information obtained when the information terminal 111 logs into the management server 10 to acquire the Proxy-PAC file 1900. In this embodiment, accordingly, a value that is difficult for a third party to estimate (this value is hereinafter referred to as "secret") is used to set the source from which the Proxy-PAC file 1900 is acquired.

The secret may be calculated by, for example, Equation (1) below.

$$\text{secret}=\text{sha512sum}(\text{tenant ID}+\text{user ID}+\text{fixed secret character string}) \quad (1)$$

In the setting screen 1800 illustrated in FIG. 18A, the value of the secret is set to be "secret=7d099e3" because not all of the digits can be displayed in the setting screen 1800, and is actually set to be, for example, a value 1802 illustrated in FIG. 18B as follows:
secret=7d099e3976e2be937cbe6d749e09737149cec03d67d1427a94ff3764cfbccfe69737a8f772e1efabafa3d53d09041782d76b8e0b36be19902aae65835af2f9c2

The tenant ID is, for example, identification information identifying a contract unit such as a company, an organization, or a group, and the user ID is identification information identifying a user.

For example, the setting management unit 1501 of the management server 10 may provide a user with a web page for displaying a secret different for each user. In this case, the user copies the displayed secret and pastes the copied secret in a URL input field 1801 of the setting screen 1800 illustrated in FIG. 18A to easily set the source from which the Proxy-PAC file 1900 is acquired.

FIG. 19 illustrates an example of the Proxy-PAC file 1900 according to the second embodiment. In the example illustrated in FIG. 19, "https_proxy" in the Proxy-PAC file 1900 is set to ""tenant ID"+"secret".proxy.srws.example.ricoh.com:443", which is a value that is difficult for a third party to estimate. The Proxy-PAC file 1900 has settings 1901 in which the URL starts with "https:" or "wss:" and the proxy server indicated by "https_proxy" described above is set to be accessed when the destination is "internal.example.com". When accessed from the information terminal 111 or the like, the proxy server may request the user to enter, for example, a user name and a password.

Referring back to FIG. 17, the functional configuration of the information terminal 111 will be described.

The element acquisition unit 602 is implemented by, for example, the web browser 1700 executed by the CPU 201, and acquires an element such as an HTML request from the HTML or the like of a web page. Further, the element acquisition unit 602 outputs a request for acquiring data used to generate a DOM, such as a CSS or JavaScript (registered trademark) file, to the request analysis unit 603.

The request analysis unit 603 analyzes the request accepted from the element acquisition unit 602 and determines whether to transmit the request to a proxy server or transmit the request directly to a web server, based on, for example, the settings of the Proxy-PAC file 1900 illustrated in FIG. 19.

The second communication control unit 604 uses the session ID notified by the management server 10 to request the relay server 13 to establish a connection, and connects to the relay server 13 via the encrypted second communication 4. Further, the second communication control unit 604 selectively transmits a request, which is determined by the request analysis unit 603 to be transmitted to a proxy server, to the proxy server unit 403 included in the relay server 13, and receives a response to the transmitted request.

The third communication control unit 1702 transmits a request, which is determined by the request analysis unit 603 to be transmitted directly to a web server, directly to the web server as the destination of the request, and receives a response to the transmitted request.

The rendering unit 607 renders a display screen using data received by the second communication control unit 604 or the third communication control unit 1702. The operation acceptance unit 608 accepts an operation on the display screen displayed by the rendering unit 607.

Operation

Process of Communication System

Figure 20:
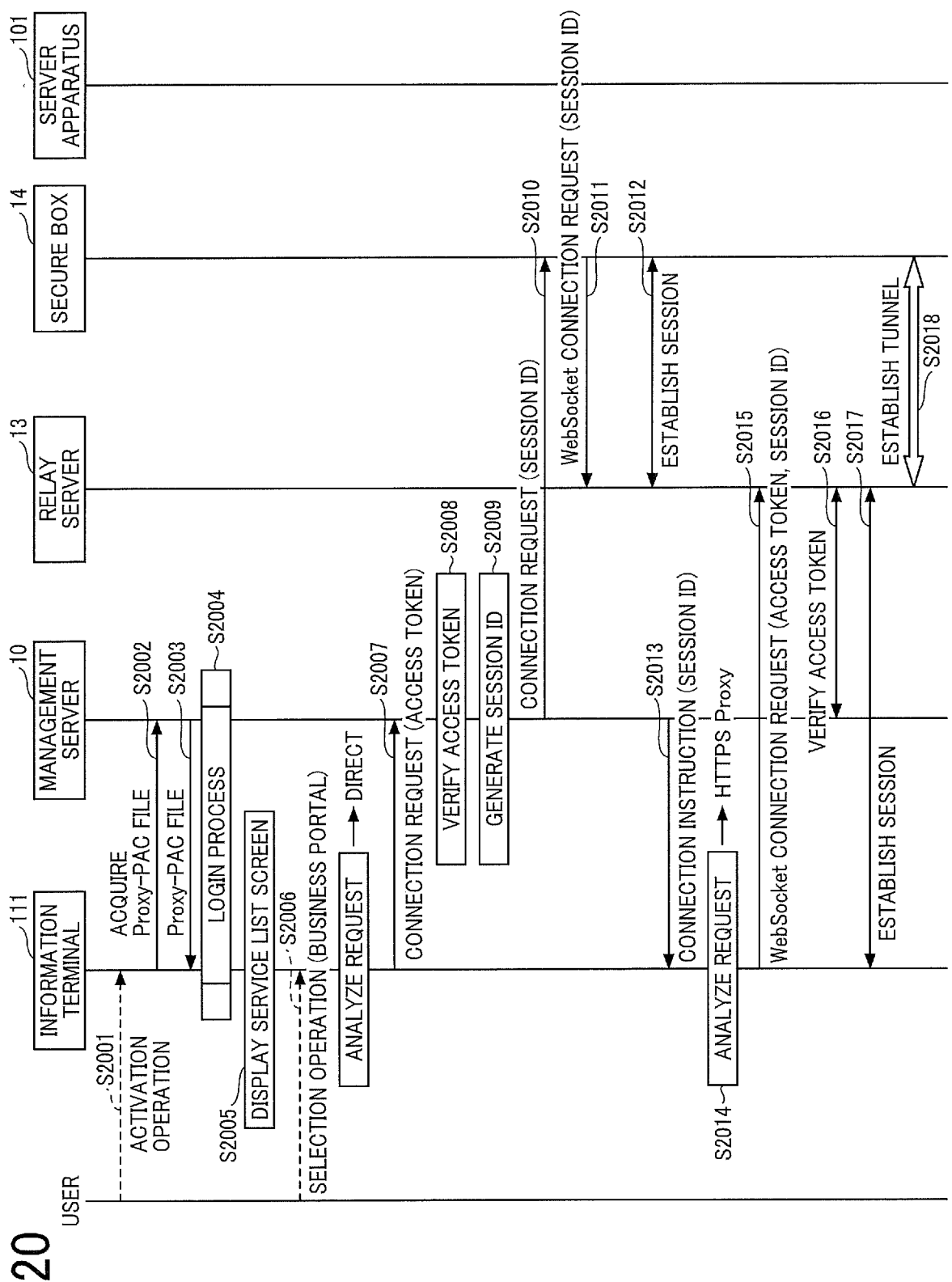
FIG. 20 is a sequence diagram illustrating an example process of a communication system according to the second embodiment.
Figure 21:
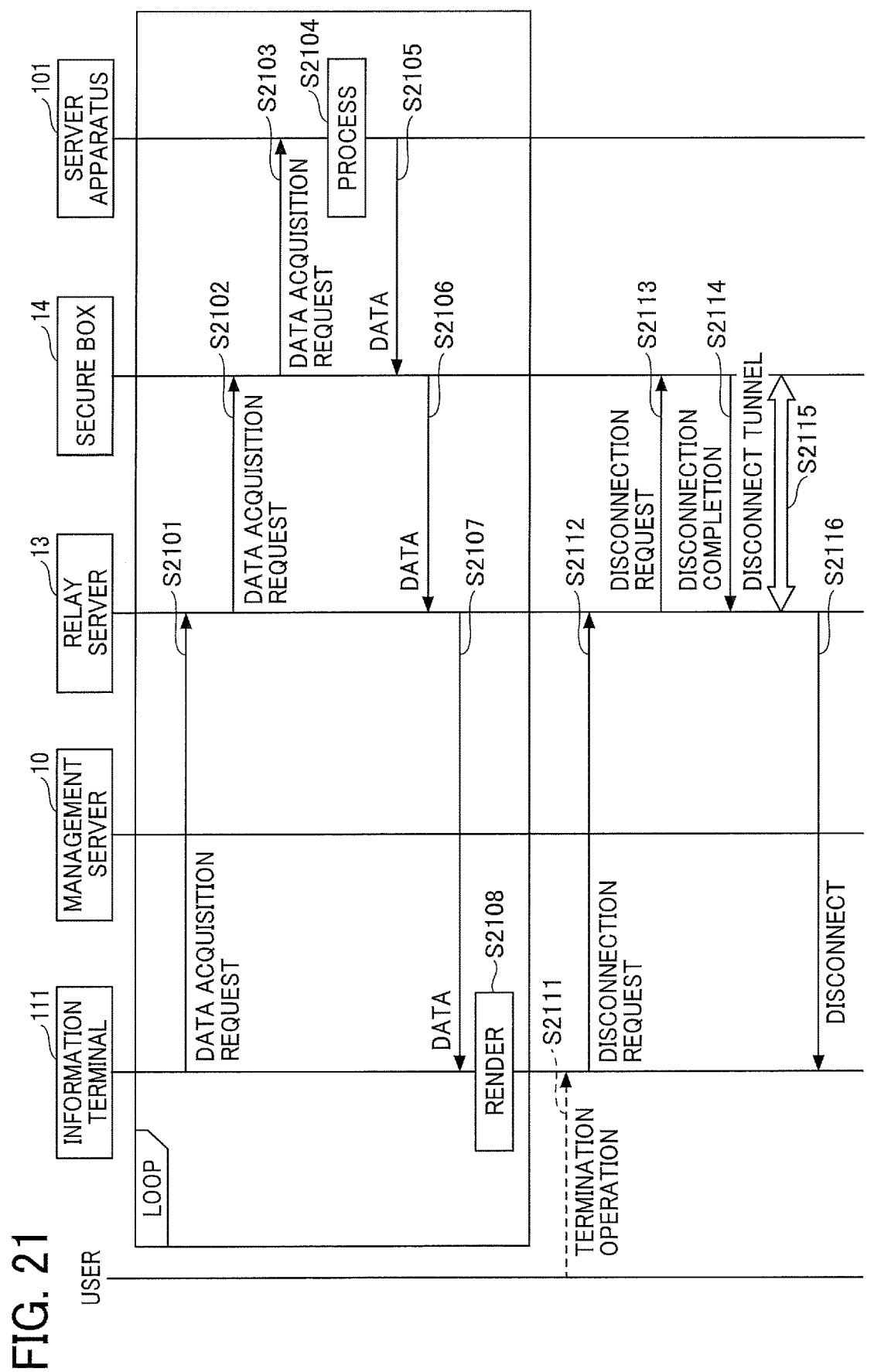
FIG. 21 is a sequence diagram illustrating an example process of the communication system according to the second embodiment.

FIGS. 20 and 21 are sequence diagrams illustrating an example process of the communication system 1 according to the second embodiment. The illustrated process is another example of a process executed by the communication system 1 when a user who uses the information terminal 111 is to use a business portal, which is an example of a web service provided by the server apparatus 101 in the local network 100. It is assumed that, at the start of the process illustrated in FIG. 20, the session management unit 304 of the communication management unit 303 and the first communication control unit 402 of the secure box 14 have been communicably connected to each other in accordance with the MQTT protocol or any other suitable protocol, for example. It is also assumed that the source from which the Proxy-PAC file 1900 is acquired has already been set in the web browser 1700 of the information terminal 111 by using, for example, the setting screen 1800 illustrated in FIG. 18A.

In step S2001, the user performs an activation operation for activating the web browser 1700 of the information terminal 111.

In steps S2002 and S2003, upon activation of the web browser 1700, the setting unit 1701 acquires a Proxy-PAC file from a preset source from which the Proxy-PAC file is acquired. The acquired Proxy-PAC file is set in advance such that the request for the URL related to the server apparatus 101 and the relay server 13 is transmitted to a proxy server and the request for the URL related to the management server 10 is transmitted directly to the management server 10.

In steps S2004 and S2005, the communication system 1 executes, for example, the login process illustrated in FIG. 7, and the web browser 1700 of the information terminal 111 displays the service list screen 1100 illustrated in FIG. 11.

In step S2006, the user performs an operation of selecting a business portal on the service list screen 1100.

Then, the request analysis unit 603 of the information terminal 111 analyzes the request to be transmitted next, and determines, based on the acquired Proxy-PAC file, whether to transmit the request to the proxy server or transmit the request directly to the destination. In the illustrated example, since the destination of the request (connection request) to be transmitted next is the management server 10, the request analysis unit 603 determines to transmit the request directly to the management server 10.

In step S2007, the third communication control unit 1702 of the information terminal 111 transmits a connection request including the access token acquired in the login process in step S2004 to the communication management unit 303 of the management server 10.

In step S2008, in response to receipt of the connection request from the information terminal 111, the communication management unit 303 of the management server 10 verifies the access token included in the connection request using the authentication unit 302. If the result of the verification of the access token is "OK" (if the user is an authorized user), in step S2009, the communication management unit 303 generates a session ID identifying a session. On the other hand, if the result of the verification of the access token is not "OK", for example, the communication management unit 303 notifies the information terminal 111 of an error and stops the execution of the processing of step S2009.

In step S2010, the communication management unit 303 of the management server 10 transmits to the secure box 14 a request for connecting to the relay server 13. The request includes the issued session ID.

In step S2011, the first communication control unit 402 of the secure box 14 transmits to the relay server 13 a WebSocket connection request including the session ID notified by the management server 10.

In step S2012, in response to receipt of the connection request from the secure box 14, the connection management unit 312 of the relay server 13 establishes a session of the encrypted first communication 3 based on wws, for example, with the secure box 14 from which the connection request is received.

In step S2013, the communication management unit 303 of the management server 10 transmits a connection instruction including the session ID generated in step S2009 to the information terminal 111 from which the connection request is received.

In step S2014, the request analysis unit 603 of the information terminal 111 analyzes the request to be transmitted next, and determines, based on the acquired Proxy-PAC file, whether to transmit the request to the proxy server or transmit the request directly to the destination. In the illustrated example, since the destination of the request (WebSocket connection request) to be transmitted next is the relay server 13, the request analysis unit 603 determines to transmit the request to the proxy server (relay server 13).

In step S2015, the second communication control unit 604 of the information terminal 111 transmits a WebSocket connection request to the relay server 13. The WebSocket connection request includes, for example, the access token acquired in step S2004 and the session ID notified by the management server 10.

In step S2016, in response to receipt of the WebSocket connection request from the information terminal 111, the connection management unit 312 of the relay server 13 verifies the access token included in the WebSocket connection request using the authentication unit 302 of the management server 10. If the result of the verification of the access token is "OK" (if the user is an authorized user), in step S2017, the connection management unit 312 of the relay server 13 establishes a session of the encrypted second communication 4 based on wws, for example, with the information terminal 111.

On the other hand, if the result of the verification of the access token is not "OK", the connection management unit 312 of the relay server 13 stops the execution of the processing of step S2017 and rejects the connection to the relay server 13 (or discards the WebSocket connection request).

The process described above enables the web browser 1700 of the information terminal 111 to use the proxy server unit 403 of the relay server 13 as a proxy server. A tunnel is established between the relay server 13 and the secure box 14 (step S2018). This enables the proxy server unit 403 of the relay server 13 to communicate with the server apparatus 101 via the established tunnel and the transfer unit 1601 functioning as a TCP relay in the secure box 14.

The web browser 1700 of the information terminal 111 repeatedly executes the processing of steps S2101 to S2108 illustrated in FIG. 21. As a result, the web browser 1700 of the information terminal 111 is capable of displaying, for example, a business portal screen 2200 illustrated in FIG. 22.

For example, in step S2101, the rendering unit 607 of the information terminal 111 generates an HTTPS request (data acquisition request) to display the business portal screen 2200 provided by the server apparatus 101. Further, the request analysis unit 603 determines to transmit the generated data acquisition request to the proxy server, and the second communication control unit 604 transmits the generated data acquisition request to the proxy server unit 403 of the relay server 13.

In steps S2102 and S2103, in response to receipt of the data acquisition request from the information terminal 111, the proxy server unit 403 of the relay server 13 transmits the received data acquisition request to the server apparatus 101 via the transfer unit 1601 of the secure box 14.

In steps S2104 to S2106, in response to receipt of the data acquisition request, the web server unit 411 of the server apparatus 101 transmits data such as HTML data to the relay server 13 via the transfer unit 1601 of the secure box 14 as a response.

In step S2107, in response to receipt of the data (response) from the server apparatus 101, the proxy server unit 403 of the relay server 13 transmits the received data to the information terminal 111.

Figure 22:
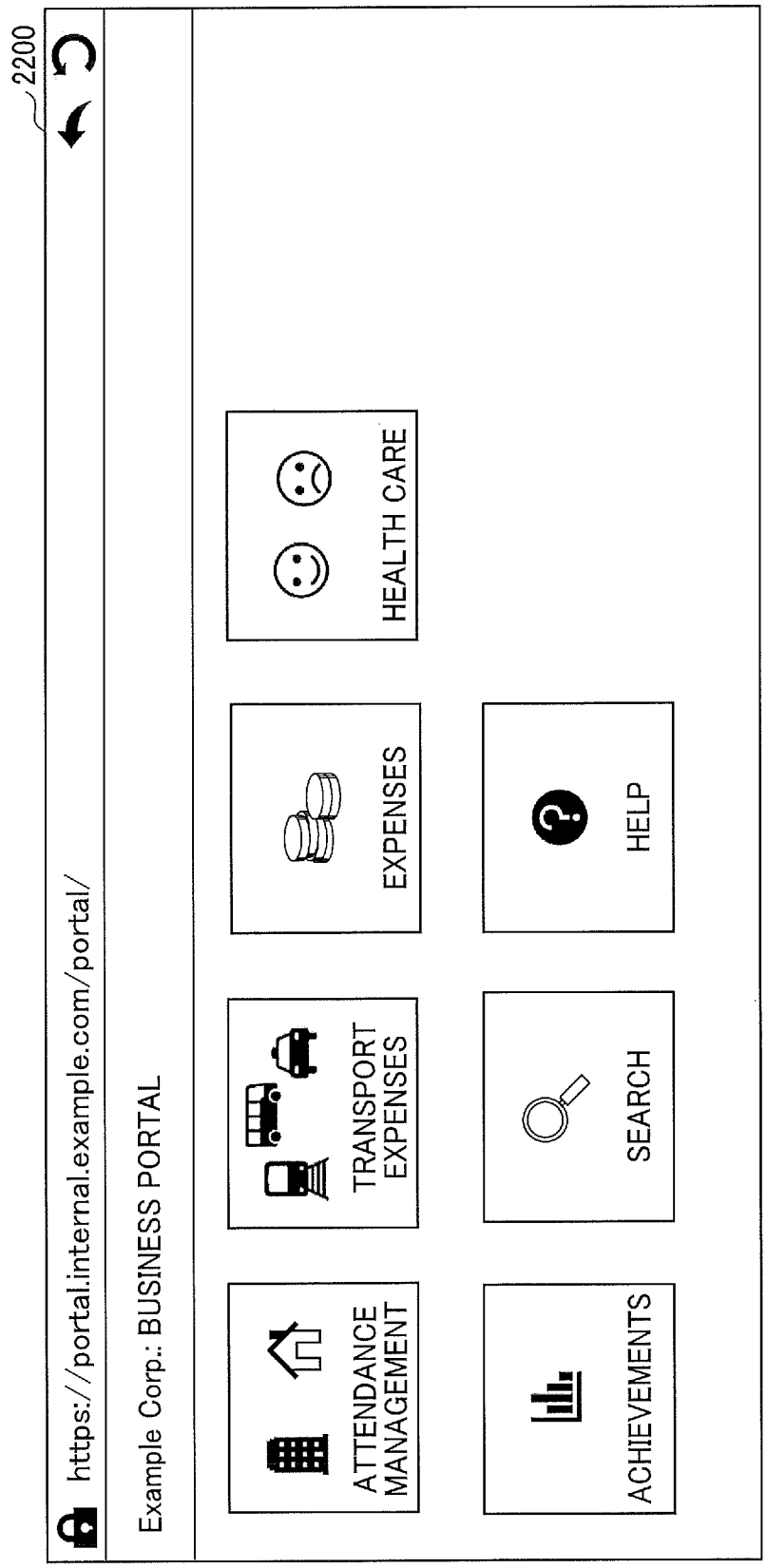
FIG. 22 is a view illustrating an example of a business portal screen according to the second embodiment.

In step S2108, the rendering unit 607 of the information terminal 111 uses the data received from the relay server 13 to display, for example, the business portal screen 2200 illustrated in FIG. 22.

The transmission and reception of the request and the response between the information terminal 111 and the server apparatus 101, which are illustrated in steps S2101 to S2108 in FIG. 21, continue until the communication is terminated.

Next, an example process for terminating communication will be described with reference to FIG. 21.

In step S2111, in response to the user performing a termination operation on the web browser of the information terminal 111, the communication system 1 executes the processing of step S2112 and the subsequent processing.

In step S2112, in response to the web browser 1700 of the information terminal 111 receiving the termination operation performed by the user, the second communication control unit 604 transmits a disconnection request to the relay server 13.

In steps S2113 and S2114, the connection management unit 312 of the relay server 13 disconnects the session with the secure box 14. As a result, in step S2115, the tunnel between the relay server 13 and the secure box 14 is disconnected.

In step S2116, the connection management unit 312 of the relay server 13 disconnects the session with the information terminal 111.

Data Flow

Figure 23:
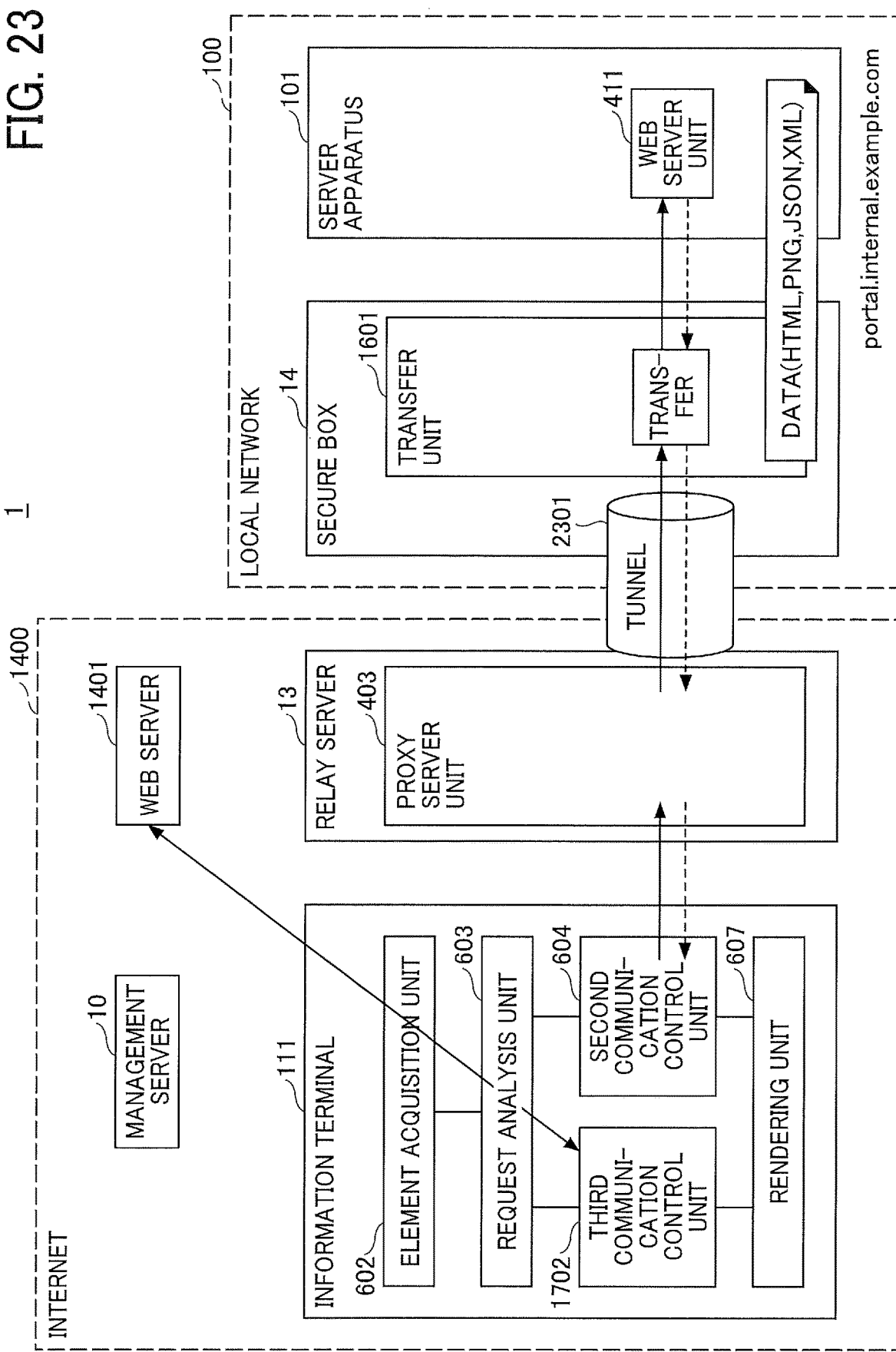
FIG. 23 is a diagram illustrating a data flow after the establishment of a tunnel according to the second embodiment.

FIG. 23 is a diagram illustrating a data flow after the establishment of a tunnel according to the second embodiment. In FIG. 23, an example of the communication system 1 is illustrated in which, for example, a tunnel 2301 using wws communication is established between the relay server 13 and the secure box 14 in step S2018 illustrated in FIG. 20. The tunnel 2301 is an example of a second communication path between the relay server 13 and the first communication control unit 402, and includes a communication path based on WebSocket.

The proxy server unit 403 of the relay server 13 is capable of transmitting and receiving data in various formats such as HTML, PNG, JSON, and XML to and from the server apparatus 101 using the tunnel 2301 and the transfer unit 1601 of the secure box 14. This enables the web browser 1700 of the information terminal 111 to transmit and receive requests and responses to and from the web server unit 411 of the server apparatus 101 using the proxy server unit 403 of the relay server 13.

As described above, the second embodiment allows a user to easily use a web service provided by a web server (the server apparatus 101) connected to the local network 100 from a web browser of an accessing terminal (the information terminal 111) connectable to the Internet.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The group of apparatuses described in one or more embodiments is merely one of a plurality of computing environments for implementing the one or more embodiments disclosed herein. In some embodiments, the management server 10, the relay server 13, or the server apparatus 101 includes a plurality of computing devices, such as a server cluster. The plurality of computing devices are configured to communicate with one another via any type of communication link including, for example, a network and a shared memory, and perform the processes disclosed herein. The components of the management server 10, the relay server 13, or the server apparatus 101 may be integrated into one server apparatus or divided into a plurality of apparatuses.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A communication system comprising:
a management server configured to
transmit a login screen to an information terminal, the login screen being displayed in a web browser of the information terminal,
receive, from the information terminal connectable to a first network, login information for a user, the login information for the user being input into the web browser of the information terminal,
determine, based on the login information, whether to authenticate the user,
when the user is authenticated, transmit an instruction to display, in the web browser of the information terminal, a service list including a plurality of web services that are selectable by the user,
receive a connection request for connecting to a web service of the plurality of web services contained in the service list that are provided by a web server connectable to a second network different from the first network, and
transmit the connection request to a communication apparatus connectable to the second network;
the communication apparatus configured to
receive the connection request from the management server, and
in response to receiving the connection request from the management server, transmit a first WebSocket connection request to a relay server;
the information terminal connectable to the first network, the information terminal configured to
display the service list in response to the user being authenticated, and
transmit a second WebSocket connection request to the relay server; and
the relay server configured to
receive the first WebSocket connection request from the communication apparatus,
in response to receiving the first WebSocket connection request, establish a first encrypted communication session between the relay server and the communication apparatus,
receive the second WebSocket connection request from the information terminal, and
in response to receiving the second WebSocket connection request, establish a second encrypted communication session between the relay server and the information terminal,
wherein the first and second encrypted communication sessions enable communication of data between the information terminal and the communication apparatus through the relay server.

2. The communication system according to claim 1, further comprising:
the relay server configured to establish a first communication path between the communication apparatus and the information terminal.

3. The communication system according to claim 2, wherein the first communication path includes a communication path based on WebSocket.

4. The communication system according to claim 2, further comprising:
the communication apparatus including
a proxy server configured to communicate with the web browser of the information terminal via the first communication path.

5. The communication system according to claim 1, further comprising:
the relay server configured to establish a second communication path between the communication apparatus and the relay server, and
wherein the relay server includes a proxy server configured to communicate with the web browser of the information terminal via the first network.

6. The communication system according to claim 5, wherein the information terminal is configured to selectively transmit a request for the web service to the relay server.

7. The communication system according to claim 1, further comprising:
the relay server configured to permit connection from the information terminal to the relay server based on the determination that the user is an authorized user.

8. The communication system according to claim 1, wherein the connection to the relay server is established based on a session ID generated by an application server, wherein the session ID identifies a session.

9. The communication system according to claim 1, wherein the second WebSocket connection request includes an access token,
   wherein the relay server determines whether the access token is acceptable,
   the relay server establishing the second encrypted communication session in response to determining that the access token is acceptable, and
   the relay server rejecting the second WebSocket connection request and refusing to establish the second encrypted communication session in response to determining that the access token is not acceptable.

10. The communication system according to claim 1, wherein in response to the web browser receiving a termination operation performed by the user, the relay server disconnects the first encrypted communication session such that the relay server is no longer in communications with the communication apparatus.

11. A communication control method performed by a computer to control remote access from an information terminal connectable to a first network to a web server connectable to a second network different from the first network, the computer being connectable to the second network, the communication control method comprising:
   transmitting, from a management server to the information terminal, a login screen, the login screen being displayed in a web browser of the information terminal;
   receiving, at the management server, login information from a user, the login information of the user being input into the web browser of the information terminal;
   determining, by the management server, whether to authenticate the user based on the received login information;
   when the user is authenticated based on the received login information, displaying, in the web browser of the user terminal, a service list including a plurality of web services that are selectable by the user, the plurality of web services being web services that are provided by the web server;
   receiving, at the management server, a connection request for connecting to a web service of the plurality of web services contained in the service list provided by the web server, the connection request being made from the web browser included in the information terminal;
   transmitting the connection request to the computer;
   receiving, at the computer, the connection request;
   in response to receiving the connection request, transmitting a first WebSocket connection request to a relay server;
   receiving, at the relay server, the first WebSocket connection request;
   in response to receiving the first WebSocket connection request, establishing a first encrypted communication session between the relay server and the computer;
   transmitting, from the information terminal, a second WebSocket connection request;
   receiving, at the relay server, the second WebSocket connection request; and
   in response to receiving the second WebSocket connection request, establishing a second encrypted communication session between the relay server and the information terminal,
   wherein the first and second encrypted communication sessions enable communication of data between the information terminal and the communication apparatus through the relay server.

12. A non-transitory recording medium storing a plurality of instructions which, when executed by one or more processors, cause the processors to perform a communication control method comprising:
   transmitting, from a management server to an information terminal, a login screen, the login screen being displayed in a web browser of the information terminal;
   receiving, at the management server, login information from a user, the login information of the user being input into the web browser of the information terminal;
   determining, by the management server, whether to authenticate the user based on the received login information;
   when the user is authenticated based on the received login information, displaying, in the web browser of the user terminal, a service list including a plurality of web services that are selectable by the user, the plurality of web services being web services that are provided by the web server;
   receiving, at the management server, a connection request for connecting to a web service of the plurality of web services contained in the service list provided by the web server, the connection request being made from the web browser included in the information terminal;
   transmitting the connection request to a computer;
   receiving, at the computer, the connection request;
   in response to receiving the connection request, transmitting a first WebSocket connection request to a relay server;
   receiving, at the relay server, the first WebSocket connection request;
   in response to receiving the first WebSocket connection request, establishing a first encrypted communication session between the relay server and the computer;
   transmitting, from the information terminal, a second WebSocket connection request;
   receiving, at the relay server, the second WebSocket connection request; and
   in response to receiving the second WebSocket connection request, establishing a second encrypted communication session between the relay server and the information terminal,
   wherein the first and second encrypted communication sessions enable communication of data between the information terminal and the communication apparatus through the relay server.

* * * * *